(12) United States Patent
Tsuda et al.

(10) Patent No.: US 7,599,021 B2
(45) Date of Patent: Oct. 6, 2009

(54) LIQUID CRYSTAL DISPLAY DEVICE

(75) Inventors: Kazuhiko Tsuda, Ikoma-gun (JP); Shun Ueki, Nara (JP); Kozo Nakamura, Kashiba (JP); Tokio Taguchi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 228 days.

(21) Appl. No.: 10/564,818

(22) PCT Filed: Jul. 21, 2004

(86) PCT No.: PCT/JP2004/010327

§ 371 (c)(1), (2), (4) Date: Jan. 18, 2006

(87) PCT Pub. No.: WO2005/008322

PCT Pub. Date: Jan. 27, 2005

(65) Prior Publication Data

US 2006/0187380 A1 Aug. 24, 2006

(30) Foreign Application Priority Data

Jul. 23, 2003 (JP) ............................. 2003-200607

(51) Int. Cl.
*G02F 1/1335* (2006.01)
(52) U.S. Cl. ................. 349/96; 349/62; 349/65
(58) Field of Classification Search ........... 349/96–100, 349/62–65, 69, 113–114
See application file for complete search history.

(56) References Cited

U.S. PATENT DOCUMENTS 5,726,723 A * 3/1998 Wang et al. ................. 349/75

6,147,937 A * 11/2000 Arikawa et al. ............. 368/242

(Continued)

FOREIGN PATENT DOCUMENTS

CN 1207181 A 2/1999

(Continued)

OTHER PUBLICATIONS

International Search Report for PCT/JP2004/010327 dated Nov. 2, 2004 (English and Japanese).

*Primary Examiner*—Brian M. Healy
*Assistant Examiner*—Guy G Anderson
(74) *Attorney, Agent, or Firm*—Nixon & Vanderhye P.C.

(57) ABSTRACT

A liquid crystal display device includes, from its back surface side towards its front surface side: a polarization selective reflection plate (12) which reflects x-directional linearly polarized light and transmits y-directional linearly polarized light; a first polarizing plate (4) which transmits the x-directional linearly polarized light; a liquid crystal display panel (13); and a second polarizing plate (8) which transmits the y-directional linearly polarized light. The polarization selective reflection plate (12) is arranged only on a back surface side of the liquid crystal display panel (13). The y-directional linearly polarized light incident on the back surface side is reflected from the polarization selective reflection plate (12), there by protecting privacy. The x-directional linearly polarized light transmitted reaches the front surface side, via the first polarizing plate (4), the liquid crystal display panel (13), and the second polarizing plate (8). In this way, it is possible to realize a liquid crystal display device which is capable of performing a good screen displaying even under a strong surrounding light environment.

7 Claims, 13 Drawing Sheets

U.S. PATENT DOCUMENTS

| | | |
|---|---|---|
| 6,246,455 B1 | 6/2001 | Iijima et al. |
| 6,437,840 B1 * | 8/2002 | Arikawa et al. ............... 349/62 |
| 6,573,963 B2 * | 6/2003 | Ouderkirk et al. ........... 349/117 |
| 6,643,224 B1 * | 11/2003 | Sekiguchi et al. ........... 368/242 |
| 6,678,217 B2 * | 1/2004 | Bastruk ....................... 368/84 |
| 2003/0011726 A1 | 1/2003 | Fujii |
| 2004/0001173 A1 | 1/2004 | Yamauchi |
| 2005/0073627 A1 | 4/2005 | Akiyama |

FOREIGN PATENT DOCUMENTS

| | | |
|---|---|---|
| CN | 1397825 A | 2/2003 |
| JP | 9-265069 A | 10/1997 |
| JP | 10-268297 | 10/1998 |
| JP | 11-52374 A | 2/1999 |
| JP | 11-95199 A | 4/1999 |
| JP | 2003-029251 | 1/2003 |

* cited by examiner

LIQUID CRYSTAL DISPLAY DEVICE

This application is the U.S. national phase of international application PCT/JP2004/010327 filed 21 Jul. 2004, which designated the U.S. and claims benefit of JP 2003-200607 filed 23 Jul. 2003, the entire contents of each of which are hereby incorporated by reference.

TECHNICAL FIELD

The present invention relates to a liquid crystal display device. More specifically, the present invention relates to a transmissive liquid crystal display device which is excellent in visibility even under strong surrounding light.

BACKGROUND ART

Amongst various types of display device, a practical application of a liquid crystal display device (Hereinafter, LCD) has been developed in recent years. This is because the LCD which uses liquid crystal is capable of performing a screen displaying with a low power consumption. As a display mode of the LCD and as a driving method, two methods are suggested. These methods are a simple matrix method and an active matrix method. Meanwhile, along with a progress in the development of multimedia technology for information communications, there is an increasing needs for a higher resolution, a higher contrast, and a wider view-angle of a display, and an ability to display multiple grayscale levels (i.e., an ability to perform multiple color displaying or full color displaying). Under such circumstances, it appears that such needs are difficult to be satisfied by using the simple matrix method. In view of that, there is suggested the active matrix method in which a switching element (active element) is provided to each pixel, for increasing the number of drivable scanning line electrodes.

With this technology of active matrix method, the resolution, contrast, and view-angle of the display have been improved, and the number of grayscale levels to be produced has been increased. A liquid crystal display device of the active matrix method includes: pixel electrodes arranged in a matrix manner; scanning lines extended nearby the pixel electrodes, the scanning lines electrically connected with the pixel electrodes via switching elements. The switching element can be a nonlinear element having two terminals, or a nonlinear element having three terminals. A representative switching element currently adopted is a thin film transistor (Hereinafter, TFT) which is a three terminal element.

Further, in recent years, the active matrix LCD is rapidly growing its popularity amongst mobile devices such as a mobile phone.

Incidentally, a conventional transmissive LCD performs a transmissive display by using a backlight unit arranged on a back surface of a liquid crystal display panel. This method results in a good screen displaying, when used under an indoor environment or the like, where surrounding light is relatively weak. However, when using such a transmissive LCD under an outdoor environment or nearby a window, where the transmissive LCD is directly exposed to strong surrounding light such as the sunlight, the surrounding light is reflected from a surface of the liquid crystal display panel and/or internal wiring. Since an amount of the reflected light surpasses the light emitted from the backlight unit and transmitted through the liquid crystal display panel, it has been virtually impossible to view a displayed item (i.e. to obtain a good visibility) under an environment where the surrounding light is strong.

In view of that problem, a reflective LCD device and semi transmissive LCD device have been developed, so as to obtain a good visibility even under the strong surrounding light environment. The reflective LCD device and the semi transmissive LCD device have a reflecting section (reflecting plate) which performs the screen displaying by reflecting the surrounding light within the liquid crystal panel. In such a configuration, the brightness is acquired, but the color purity is deteriorated. Further, the brightness will become inadequate, if a density of a color filter corresponding to the reflecting section is raised. Accordingly, it has been virtually impossible to realize a beautiful displaying of an image, by using the reflecting section.

For example, Patent document 1 (hereinafter, referred to as conventional example 1) or Patent document 2 (Hereinafter, referred to as conventional example 2) discloses an LCD device with a light converging mechanism. This LCD device includes means for converging external light (surrounding light) on to a light-guiding plate which is provided on a back surface of the transmissive LCD device. Each of the LCD devices disclosed in these patent documents has a light converging section (light inlet section) which is formed, in a lens-like shape, on an end portion of the light-guiding plate. In the LCD device of conventional example 1, a first light irradiating section serving as a wedge-shaped converging section and a second light irradiating section serving as a wedge-shaped light source section are laminated on an LCD panel, so that the respective thicknesses are complemented. On the other hand, the LCD device of the conventional example 2 is provided with a light-guiding section behind an LCD, and the light converging section for connecting the light path with this light-guiding section. The light-guiding section has on its periphery a mirror finished surface, except for (a) a surface from which light is emitted toward the LCD and (b) an aperture to which light from the light converging section enters. In both of the LCD devices of the conventional examples 1 and 2, the external light converged by the light converging section is guided and diffusely reflected by the light-guiding section (light-irradiating section). Thus the external light is irradiated as a plane light source to the LCD.

Further, as a liquid crystal display device which performs a displaying process by using the surrounding light, there is an LCD device (Hereinafter, conventional example 3) whose back surface side is made transparent by removing a reflection sheet arranged on an opposite side (back surface side to) to the side of a liquid crystal panel in the light-guiding plate, used in the transmissive LCD device. In this configuration, sufficient aperture for taking in the light is acquired, because the surrounding light enters from the back surface of the liquid crystal display panel. As a result, a good display can be performed under a strong surrounding light environment.

Further, for example, Patent document 3 discloses another example of the LCD device which performs the displaying operation by using the surrounding light, the LCD device including a semi-transmissive plate on a back surface of a light-guiding member. The LCD device disclosed in the Patent document 3 (Hereinafter, conventional example 4) is a transmissive LCD device which performs the displaying operation by using a backlight. In this transmissive LCD device, a semi-transmissive plate (semi-transmissive member) and a light-shielding-use liquid crystal element (TN type liquid crystal element) are arranged at the back of the light-guiding member. That is, in the LCD device, the light-shielding-use liquid crystal element is provided on an opposite side to the side of the light-guiding member in a semi-transmissive plate, so as to allow switching over operation between (i) a light-transmitting mode which transmits the external light, and (ii) a light-shielding mode which blocks the external light. By switching over the light-shielding-use liquid crystal element to the light-transmitting mode, the external light from the back surface can be used. Further, by switching the light-shielding-use liquid crystal element to the light-shielding mode, viewing of a displayed item from the back surface side is prevented, thus protecting privacy of a user. Further, with the use of the semi-transmissive plate, it is possible to use the light emitted from the back surface side of the light-guiding member.

(Patent document 1)

Japanese Unexamined Patent Publication No. 11-52374/1999 (Tokukaihei 11-52374; published on Feb. 26, 1999)

(Patent document 2)

Japanese Unexamined Patent Publication No. 11-95199/1999 (Tokukaihei 11-95199; published on Apr. 9, 1999)

(Patent document 3)

Japanese Unexamined Patent Publication No. 9-265069/1997 (Tokukaihei 9-265069; published on Oct. 7, 1997)

However, in the above described LCD devices, there are following problems.

First, in the LCD device of the conventional examples 1 and 2, a lens-like shape is formed on the end portion of the respective light-guiding section (light irradiating section). As such, an amount of the surrounding light taken in by using the lens is proportional to an area of the lens section. Accordingly, the area of the lens section must be increased, in order to take in a larger amount of the surrounding light. This necessitates an increased thickness of the light-guiding section having the lens section. However, since an actual thickness of the light-guiding section can be increased up to several millimeters, it is impossible to use sufficient amount of surrounding light. Accordingly, the LCD devices are not capable of effectively using the surrounding light for performing a good screen displaying.

Further, in the LCD device of the conventional example 3, the back surface side of the liquid crystal display panel is transparent. Thus, it is possible to view, from the back surface side, the displayed screen on the liquid crystal display panel. This is disadvantageous in terms of privacy protection.

On the other hand, the LCD device of the conventional example 4 includes the light-shielding-use liquid crystal element, so as to use the surrounding light while protecting the privacy. However, under the environment where the surrounding light is strong, the problem regarding the privacy is not solved when the light-shielding-use liquid crystal element is switched to the light-transmitting mode. That is, the LCD device of the conventional example 4 is not able to protect the privacy, while improving visibility under the environment of the strong surrounding light at the same time. Further, the LCD device of the conventional example 4 includes the semi-transmissive plate arranged between the light-guiding member and the light-shielding-use liquid crystal element, so as to more efficiently use, while the light-shielding-use liquid crystal element is in the light-shielding mode, the light emitted from the light-guiding member in a direction toward the back surface. However, the transmissivity of the semi-transmissive plate is low. Accordingly, the efficiency of using the surrounding light is deteriorated, while the light-shielding-use liquid crystal element is in the light-transmitting mode.

In view of the above problems, the present invention is made, and it is an object of the present invention to provide a liquid crystal display device which allows a good screen displaying even under a strong surrounding light environment, while protecting privacy of a user.

DISCLOSURE OF INVENTION

In order to solve the foregoing problems, a liquid crystal display device of the present invention includes: a liquid crystal display medium including a pair of first and second polarizing plates; and a liquid crystal layer between the first and second polarizing plates, and polarization selective reflection means, provided on a side of the first polarizing plate so as to face the liquid crystal display medium, for (a) transmitting a light component, in a first polarization status, of light incident on a first surface opposite to a second surface on a side of the liquid crystal display medium, and (b) reflecting a light component, in a second polarization status, of the light incident on the first surface, the second polarization status being different from the first polarization status.

In the configuration, for example, the first polarizing plate in the liquid crystal display medium transmits the light component in the first polarization status, and the second polarizing plate transmits a light component in the second polarization status.

The light component, in the first polarization status, of the light (surrounding light) incident on the first surface opposite to the second surface on the side of the liquid crystal display medium in the selective reflection means is transmitted through the polarization selective reflection means, while the light component, in the second polarization status, of the light incident on the first surface is reflected from the polarization selective reflection means.

The light component in the first polarization status having been transmitted through the polarization selective reflection means is transmitted through the first polarizing plate of the liquid crystal display medium, and enters the liquid crystal layer. Then, in the liquid crystal layer, the light component in the first polarization status is converted into the light component in the second polarization status, and this light component in the second polarizing state reaches a viewer, via the second polarizing plate. Thus, it is possible to effectively use the light (surrounding light) incident on the first surface opposite to the second surface on the side of the liquid crystal display medium. As a result, a good screen displaying is performed even under a strong surrounding light environment.

Further, as described, since the light component, in the second polarization status, of the surrounding light is reflected from the polarization selective reflection means, it is not possible to view a displayed item from the back surface side of the liquid crystal display device. This allows for a protection of privacy of a user.

In order to solve the foregoing problems, a liquid crystal display device of the present invention includes: a liquid crystal display medium including a pair of first and second polarizing plates; and a liquid crystal layer between the first and second polarizing plates; polarization selective reflection means, provided on a side of the first polarizing plate so as to face the liquid crystal display medium, for (a) transmitting a light component, in a first polarization status, of light incident on a first surface opposite to a second surface on a side of the liquid crystal display medium, and (b) reflecting a light component, in a second polarization status, of the light incident on the first surface, the second polarization status being different from the first polarization status; and light irradiating means, provided between the polarization selective reflection means and the liquid crystal display medium, for irradiating the liquid crystal display medium with light from a light source.

In the configuration, for example, the first polarizing plate in the liquid crystal display medium transmits the light component in the first polarization status, and the second polarizing plate transmits a light component in the second polarization status.

Accordingly, the light component, in the first polarization status, of the light from the light source emitted from the light irradiating means in a direction towards the liquid crystal display medium is transmitted through the first polarizing plate, and enters the liquid crystal layer. At this point, the light reaches the viewer, if the liquid crystal layer is controlled so that the light component in the first polarization status having been transmitted through the first polarizing plate is converted into the light component in the second polarization status. Thus, it is possible to perform a good screen displaying, using the light from the light source emitted from the light irradiating means in the direction towards the liquid crystal display medium.

On the other hand, the light component, in the first polarization status, of the light from the light source emitted from the light irradiating means in a direction towards the polarization selective reflection means is transmitted through the polarization selective reflection means. Further, although the light component in the second polarization status is reflected from the polarization selective reflection means, and is incident on the liquid crystal display medium, the light component in the second polarization status is absorbed by the first polarizing plate. Accordingly, the light from the light source emitted from the light irradiating means in the direction towards the polarization selective reflection means is not used in the screen displaying.

The light component, in the first polarization status, of the light (surrounding light) incident on the first surface opposite to the second surface on the side of the liquid crystal display medium is transmitted through the polarization selective reflection means, while the light component, in the second polarization status, of the light incident on the first surface is reflected from the polarization selective reflection means.

The light component in the first polarization status having been transmitted through the polarization selective reflection means is transmitted through the first polarizing plate of the liquid crystal display medium, and enters the liquid crystal layer. Then, in the liquid crystal layer, the light component in the first polarization status is converted into the light component in the second polarization status, and this light component in the second polarizing state reaches a viewer, via the second polarizing plate. Thus, it is possible to effectively use the light (surrounding light) incident on the first surface opposite to the second surface on the side of the liquid crystal display medium. As a result, a good screen displaying is performed even under a strong surrounding light environment.

Further, as described, since the light component, in the second polarization status, of the surrounding light is reflected from the polarization selective reflection means, it is not possible to view a displayed item from the back surface side of the liquid crystal display device. This allows for a protection of privacy of a user.

As a result, it is possible to provide a liquid crystal display device which is capable of performing a good screen displaying even under a strong surrounding light environment, while allowing a bright screen displaying under a weak surrounding light environment.

Further, a liquid crystal display device of the present invention includes: a liquid crystal display medium including a pair of first and second polarizing plates; and a liquid crystal layer between the first and second polarizing plates; polarization selective reflection means, provided on a side of the first polarizing plate so as to face the liquid crystal display medium, for (a) transmitting a light component, in a first polarization status, of light incident on a first surface opposite to a second surface on a side of the liquid crystal display medium, and (b) reflecting a light component, in a second polarization status, of the light incident on the first surface, the second polarization status being different from the first polarization status; light irradiating means, provided between the polarization selective reflection means and the liquid crystal display medium, for irradiating the liquid crystal display medium with light from a light source; and polarization control means, provided between the polarization selective reflection means and the light irradiating means, for controlling a polarization status of light travelling from the polarization selective reflection means towards the liquid crystal display medium.

In the configuration, for example, the first polarizing plate in the liquid crystal display medium transmits the light component in the first polarization status, and the second polarizing plate transmits the light component in the second polarization status.

Accordingly, the light component, in the first polarization status, of the light from the light source emitted from the light irradiating means in a direction towards the liquid crystal display medium is transmitted through the first polarizing plate, and enters the liquid crystal layer. At this point, the light reaches the viewer, if the liquid crystal layer is controlled so that the light component in the first polarization status having been transmitted through the first polarizing plate is converted into the light component in the second polarization status.

On the other hand, the light component, in the second polarization status, of the light emitted from the light irradiating means in a direction towards the polarization selective reflection means is reflected from the polarization selective reflection means towards the liquid crystal display medium. In this case, the polarization control means controls the polarization status of the light traveling towards the liquid crystal display medium. At this point, for example, in accordance with an orientation status of liquid crystal molecules in the liquid crystal layer, the polarization control means converts, into the light component in the first polarization status, the light component in the second polarization status having been reflected from the polarization selective reflection means. This allows the light transmitted through the polarization control means to be transmitted through the first polarizing plate of the liquid crystal display medium, and reaches the viewer, via the second polarizing plate. Thus, it is possible to effectively use the light emitted from the light irradiating means. As a result, it is possible to achieve a good screen displaying even under a weak surrounding light environment.

Further, the light component, in the first polarization status, of the light (surrounding light) incident on the first surface opposite to the second surface on the side of the liquid crystal display medium is transmitted through the polarization selective reflection means, while the light component, in the second polarization status, of the light incident on the first surface is reflected from the polarization selective reflection means.

At this point, for example, by controlling the polarization control means so that the polarization status of the light component in the first polarization status is not varied in accordance with the orientation status of the liquid crystal molecules in the liquid crystal layer, the light having been transmitted through the polarization selective reflection means is transmitted through the polarization control means, with the polarization status being kept in the first polarization status. The light is further transmitted through the first polarizing plate of the liquid crystal display medium, and reaches the viewer via the second polarizing plate.

That is, the above described polarization control performed by the polarization controlling liquid crystal medium realizes a liquid crystal display device which is capable of performing a good screen displaying even under an environment where the light incident on the first surface of the polarization selective reflection means opposite to the second surface on the side of the liquid crystal display medium is strong.

Further, as described, since the light component, in the second polarization status, of the surrounding light is reflected from the polarization selective reflection means, it is not possible to view a displayed item from the back surface side of the liquid crystal display device. This allows for a protection of privacy of a user.

As a result, it is possible to achieve a good screen displaying even under a strong surrounding light environment, while achieving a bright screen displaying under a weak surrounding light environment, and achieving a bright screen displaying under a weak surrounding light environment.

The liquid crystal display device may further comprise an enclosure which covers an outer surface of the liquid crystal display device, the enclosure including: a display window on a surface on a side of the liquid crystal display medium of the enclosure; and a light inlet window on a surface on a side of the polarization selective reflection means of the enclosure.

In the configuration, the outer surfaces of the liquid crystal display medium, the light irradiating means, and the polarization selective reflection means is covered by the enclosure. Further, the display window is formed on the surface on the side of the liquid crystal display medium of the enclosure; and the light inlet window on the surface on the side of the polarization selective reflection means of the enclosure.

This configuration allows the liquid crystal display device to be adopted to a mobile phone or the like. Further, the configuration allows for an effective use of the light from the light inlet window, and realizes a liquid crystal display device which prevents viewing of a displayed item from its back surface side.

The liquid crystal display device may be adapted so that the polarization control means is a polarization controlling liquid crystal medium in which the polarization status of the light is controlled in accordance with an orientation status of liquid crystal molecules in the liquid crystal layer.

In the configuration, the polarization controlling liquid crystal medium is used as the polarization control means. This allows for an effective use of the light emitted from the light irradiating means in the direction towards the polarization selective reflection means.

The liquid crystal display device may be adapted so that the polarization selective reflection means transmits first linearly polarized light of light incident on the first surface opposite to the second surface on the side of the liquid crystal display medium, and reflects second linearly polarized light which is perpendicular to the first linearly polarized light.

For example, it is assumed that the first polarizing plate transmits the first linearly polarized light, and the second polarizing plate transmits the second linearly polarized light. In the configuration, the first linearly polarized light of the light (surrounding light) incident on the first surface opposite to the second surface on the side of the liquid crystal display medium is transmitted through the polarization selective reflection means. This linearly polarized light is transmitted as it is through the first polarizing plate, and is converted into the second linearly polarized light in the liquid crystal layer. Then, this second linearly polarized light is transmitted through the second polarizing plate, and reaches the viewer. This realizes a liquid crystal display device which is capable of effectively using the surrounding light.

Further, in the configuration, the second linearly polarized light of the light (surrounding light) incident on the first surface opposite to the second surface on the side of the liquid crystal display medium is reflected from the polarization selective reflection means. Due to this reflection, it is disabled to view a displayed item from the back surface side of the liquid crystal display device.

The liquid crystal display medium may be adapted so that the polarization selective reflection means transmits first circularly polarized light of light incident on the first surface opposite to the second surface on the side of the liquid crystal display medium, and reflects a second circularly polarized light whose rotative direction is opposite to that of the first circularly polarized light, said device further comprising a retardation film for converting the first circularly polarized light, which has been transmitted through the polarization selective reflection means, into linearly polarized light.

In the configuration, the first circularly polarized light of the light incident on the first surface opposite to the second surface on the side of the liquid crystal display medium is transmitted through the polarization selective reflection means. This first circularly polarized light is converted into the linearly polarized light by the retardation plate. The linearly polarized light passes through the polarization controlling liquid crystal medium. At this point, if the polarization controlling liquid crystal medium controls the polarization direction of the linearly polarized light so that the polarization direction of the linearly polarized light is parallel to a transmission axis of the first polarizing plate, the linearly polarized light is transmitted through the first polarizing plate, without changing its polarization status. Then, the linearly polarized light reaches the viewer, via the liquid crystal display medium and the second polarizing plate. This realizes a liquid crystal display device which is capable of effectively using the surrounding light.

Further, the configuration does not cause a conventionally occurring problem that a displayed item can be viewed from the back surface side of the liquid crystal display device under a strong surrounding light environment. That is, in the configuration, the polarization selective reflection means reflects the second circularly polarized light of the light incident on the first surface opposite to the second surface on the side of the liquid crystal display medium Due to the reflected light, it is disabled to view the displayed item from the first side.

Thus, with the configuration, it is possible to realize a liquid crystal display device which is capable of effectively using the surrounding light, and which prevents viewing of a displayed item from its back surface side.

In the liquid crystal display device, the liquid crystal layer of the polarization controlling liquid crystal medium may be a Twist Nematic liquid crystal layer.

In the configuration, the polarization controlling liquid crystal medium which is the Twist Nematic liquid crystal layer is capable of varying the polarization direction of the linearly polarized light, in accordance with the orientation status of the liquid crystal molecules in the liquid crystal layer. Thus, with the configuration, it is possible to realize a liquid crystal display device which is capable of effectively using the surrounding light, and which prevents viewing of a displayed item from its back surface side.

In the liquid crystal display device, the liquid crystal layer of the polarization controlling liquid crystal medium may be a parallel-aligned nematic liquid crystal layer.

In the configuration, by setting the polarization controlling liquid crystal medium which is the parallel-aligned nematic liquid crystal layer so that the polarization direction of the linearly polarized light is twisted by 90°, it is possible to control the polarization direction of the linearly polarized light as in the case of adopting the foregoing nematic liquid crystal layer.

Additional objects, features, and strengths of the present invention will be made clear by the description below. Further, the advantages of the present invention will be evident from the following explanation in reference to the drawings.

BEST MODE FOR CARRYING OUT THE INVENTION

Embodiment 1

The following describes Embodiment 1 of the present invention, with reference to FIG. 1 through FIG. 5.

Figure 2:
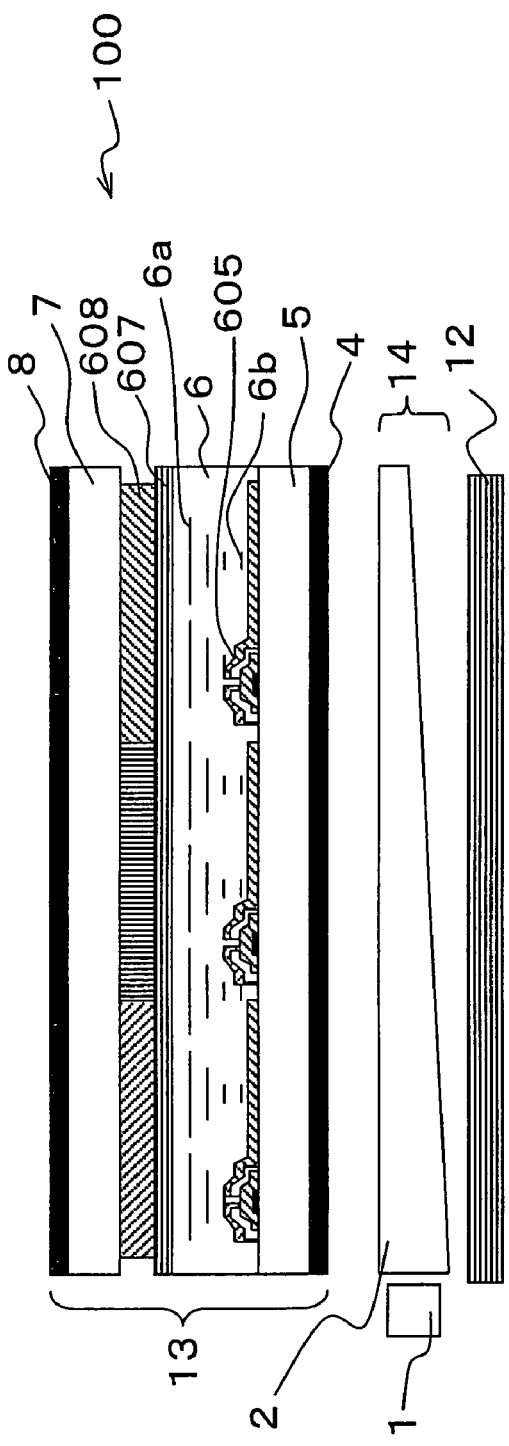
FIG. 2(a) is a cross sectional view illustrating a configuration of the liquid crystal display device of Embodiment 1 in accordance with the present invention.
FIG. 2(b) is a schematic cross sectional view illustrating a configuration of the liquid crystal display device being protected and fixed by using a casing.
Figure 2:
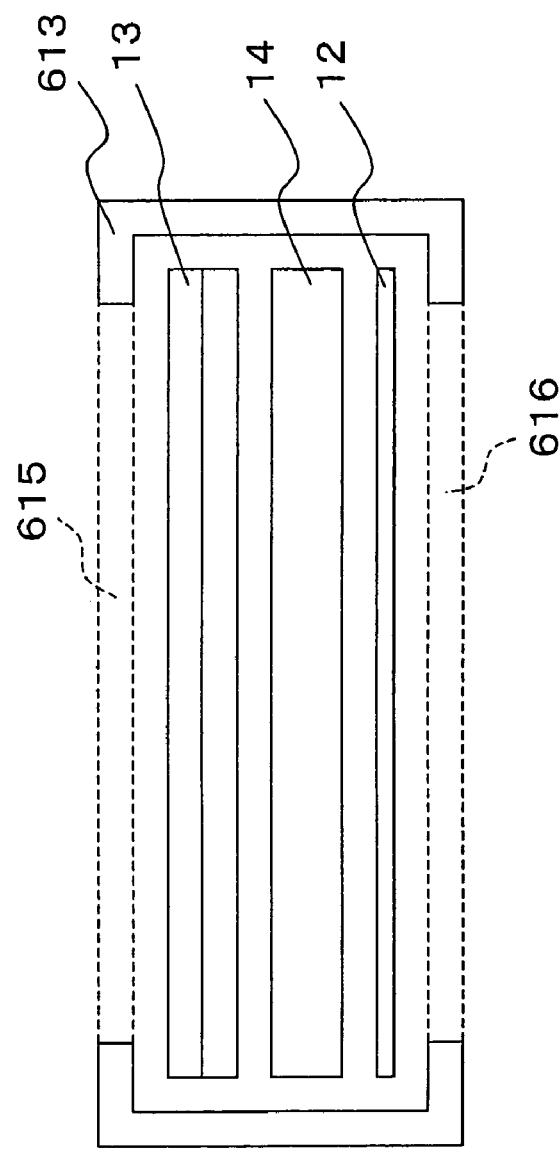

FIG. 2 (a) is a cross sectional view of a liquid crystal display device (Hereinafter, LCD device) 100 of the present embodiment. As illustrated in FIG. 2 (a), the LCD device 100 includes: a light source 1; a light-guiding plate 2; a liquid crystal display panel (liquid crystal display medium) 13; and a polarization selective reflection plate (polarization selective reflection means) 12. The light source 1 and the light-guiding plate 2 constitute a backlight (light irradiating means) 14. The liquid crystal display panel 13 and the polarization selective reflection plate 12 are provided across from each other with respect to the backlight 14. Further, in the present specification, a side of the backlight 14 on which the liquid crystal display panel 13 is provided is referred to as a front surface side (second side), and the opposite side on which the polarization selective reflection plate 12 is provided is referred to as a back surface side (first side). Further, a direction from the light-guiding plate 2 towards the liquid crystal display panel 13 is referred to as an upward direction, and the opposite direction is referred to as a downward direction. Further, a surface on the front surface side of each member is simply referred to as a front surface, and a surface on the back surface side of each member is referred to as a back surface.

The light-guiding plate 2 has a scattering-finish surface. Light emitted from the light source 1 is scattered by the scattering-finish surface 3 of the light-guiding plate 2, and is divided into light to be emitted from the light-guiding plate 2 towards the front face side, and light to be emitted towards the back surface side. Note that the backlight 14 is not limited to the one illustrated in the figure, provided that the backlight 14 includes the light source 1 and the light-guiding plate 2.

The polarization selective reflection plate 12, which is located on the back surface side of the LCD device 100, reflects linearly polarized light entering the polarization selective reflection plate 12, if a polarization direction of the linearly polarized light is parallel to a reflection axis of the polarization selective reflection plate 12. Further, the polarization selective reflection plate 12 transmits the linearly polarized light, if the polarization direction is parallel to a transmission axis of the polarization selective reflection plate 12. Accordingly, when the non-polarized light from the backlight 14 enters the polarization selective reflection plate 12, the polarization selective reflection plate 12 reflects the light (one-direction linearly polarized light) having a particular polarization direction, and transmits the light (other-direction linearly polarized light) having a different polarization direction. That is, the polarization selective reflection plate 12 has a function to selectively reflect or transmit, in accordance with a setting of the transmission axis and the reflection axis, the light whose polarization direction varies. The present embodiment deals with a case of an already-known polarization selective reflection plate which is produced by laminating polymer membranes. However, the present invention is not limited to this, provided that the one-direction linearly polarized light is transmitted and the other-direction linearly polarized light is reflected.

FIG. 2(b) illustrates a cross sectional view schematically illustrating a configuration of the LCD device 100, where the LCD device 100 is adopted to a mobile phone or the like. A casing 613 includes on its front surface side a display window 615 which is an opening provided for a screen display region of the liquid crystal display panel 13, and includes on its back surface side a light inlet window 615 whose size is substantially equal to that of the display window 615.

The liquid crystal display panel 13 includes a first polarizing plate 4, a first transparent substrate 5, a switching element 605, a liquid crystal layer 6, a transparent electrode 607, a color filter 608, a second transparent substrate 7, and a second polarizing plate 8. The liquid crystal layer 6 is sandwiched between a pair of the first transparent substrate 5 and the second transparent substrate 7. The first transparent substrate 5 is provided on the back surface side of the liquid crystal layer 6, and the second transparent substrate 7 is provided on the front surface side of the liquid crystal layer 6. The first polarizing plate 4 is provided on the back surface of the first transparent substrate 5, and the second polarizing plate 8 is provided on the front surface of the second transparent substrate 7. Note that the first transparent substrate 5 is provided with the switching element 605, and that the second transparent substrate 7 is provided with the color filter 608 and the transparent electrode 607.

The liquid crystal layer 6 is, for example, made of a TN (Twist Nematic) liquid crystal. In the present embodiment, the liquid crystal layer 6 performs the following control with respect to the linearly polarized light being incident on the liquid crystal layer 6. Namely, while no voltage is applied, the liquid crystal layer 6 causes a rotation of the polarization direction of the linearly polarized light by 90°. While voltage is applied, the liquid crystal layer 6 causes no rotation of the polarization direction of the linearly polarized light. The liquid crystal layer 6 is not limited to the TN liquid crystal, provided that the liquid crystal layer is made of liquid crystal which is capable of controlling a polarization status of the passing light.

Each of the first polarizing plate 4 and the second polarizing plate 8 has a transmission axis which is set in a predetermined direction, and transmits only a light component which is linearly polarized in the direction of the transmission axis. When, non-polarized light from the backlight 14 enters the first polarizing plate 4, the first polarizing plate 4 only transmits the linearly polarized light which is parallel to the transmission axis of the first polarizing plate 4. Further, when the linearly polarized light transmitted through the liquid crystal layer 6 enters the second polarizing plate 8, the second polarizing plate 8 transmits only the linearly polarized light which is parallel to the transmission axis of the second polarizing plate 8.

A material for the first polarizing plate 4 and the second polarizing plate 8 is preferably a material which is oriented by mixing an absorber such as iodine or dichromatic dye into a macromolecular resin film, and stretching the macromolecular film. However, the material is not particularly limited as long as the material is capable of transmitting particular linearly polarized light.

The color filter 608 is provided on the back surface of the second transparent substrate 7, and is provided for each color of R, G, and B.

The transparent electrode 607 is provided on a surface, of the color filter 608, facing towards the liquid crystal layer 6, the color filter 608 being provided on the second transparent substrate 7. A material of the transparent electrode is preferably ITO (alloy made of indium oxide and tin). However, the material for the transparent electrode is not particularly limited, and the material may be other conductive metal film having transparency. Further, the present example deals with a case where the transparent electrode material is metal. However, the transparent electrode material may be a material other than metal, such as resin or semiconductor, provided that the material is a conductive material having the transparency.

The switching element 605 is provided on the front surface of the first transparent substrate 5. For example, the switching element 605 is an active element such as TFT (Thin Film Transistor) which performs a switching operation for driving each pixel.

Figure 3:
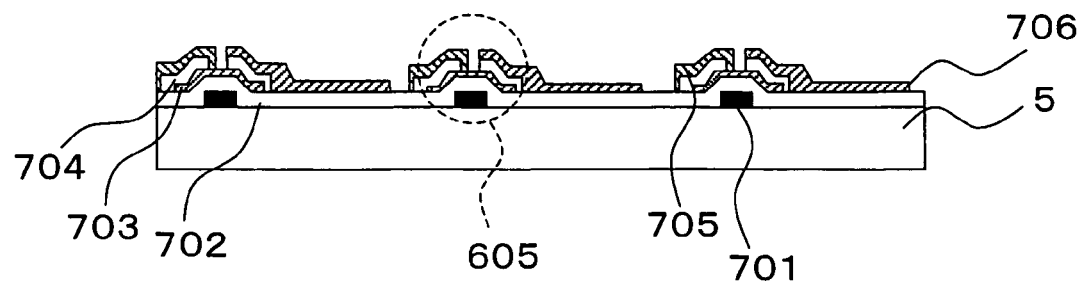
FIG. 3 is a magnified cross sectional view of a switching element in the liquid crystal display device illustrated in FIG. 2.
Figure 4:
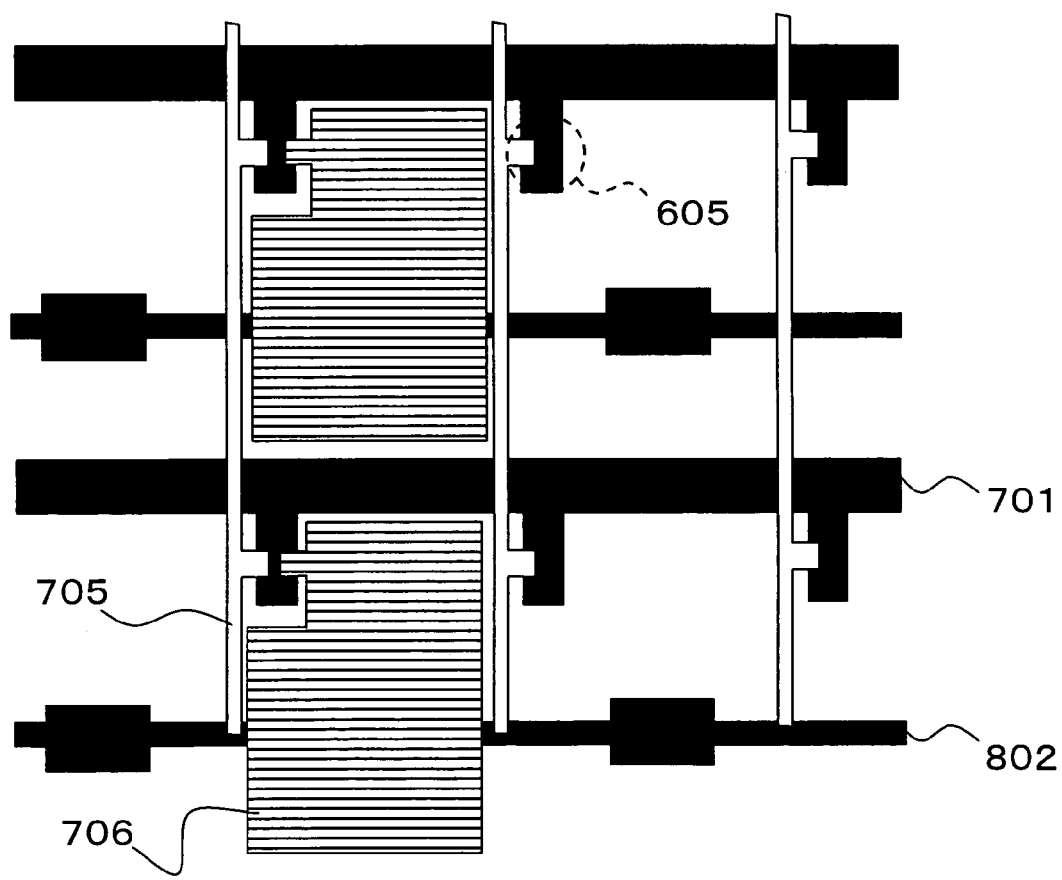
FIG. 4 is a plane view of the liquid crystal display device illustrated in FIG. 2.

Here, the following describes, with reference to FIG. 3 and FIG. 4, a configuration of the switching element 605, assuming that the switching element 605 is a TFT.

As illustrated in FIG. 3, the switching element 605 includes: gate electrodes (gate electrode lines) 701, a gate insulation film 702, an i-type amorphous silicon layer 703, an n+-type amorphous silicon layer 704, source electrodes (source electrode lines) 705, and pixel electrodes 706.

Further, as illustrated in FIG. 4, on the first transparent substrate 5 the gate electrodes (gate electrode lines) 701 and the source electrodes (source electrode lines) 705 are provided in a lattice manner. Further, between the adjacent gate electrodes (gate electrode lines) 701, an auxiliary capacitance line 802 is arranged parallel to the gate electrodes (gate electrode lines) 701.

As illustrated in FIG. 3, the switching element 605 has a gate electrode 701 on the first transparent substrate 5, and has a gate insulation layer 702 on the gate electrode 701.

Across from the gate electrode 701 with respect to the gate insulation layer 702, the i-type amorphous silicon layer 703 is formed. Further, the source electrode 705 and the pixel electrode 706 are formed above the i-type amorphous silicon layer 703, interposing the n+-type amorphous silicon layer 704. End portions of the source electrode 705 and the pixel electrode 706 are on the i-type amorphous silicon layer 703. Another end of the source electrode 705 is on the gate insulation layer 702. Further, another end of the pixel electrode 706 is on the gate insulation layer 702.

Figure 5:
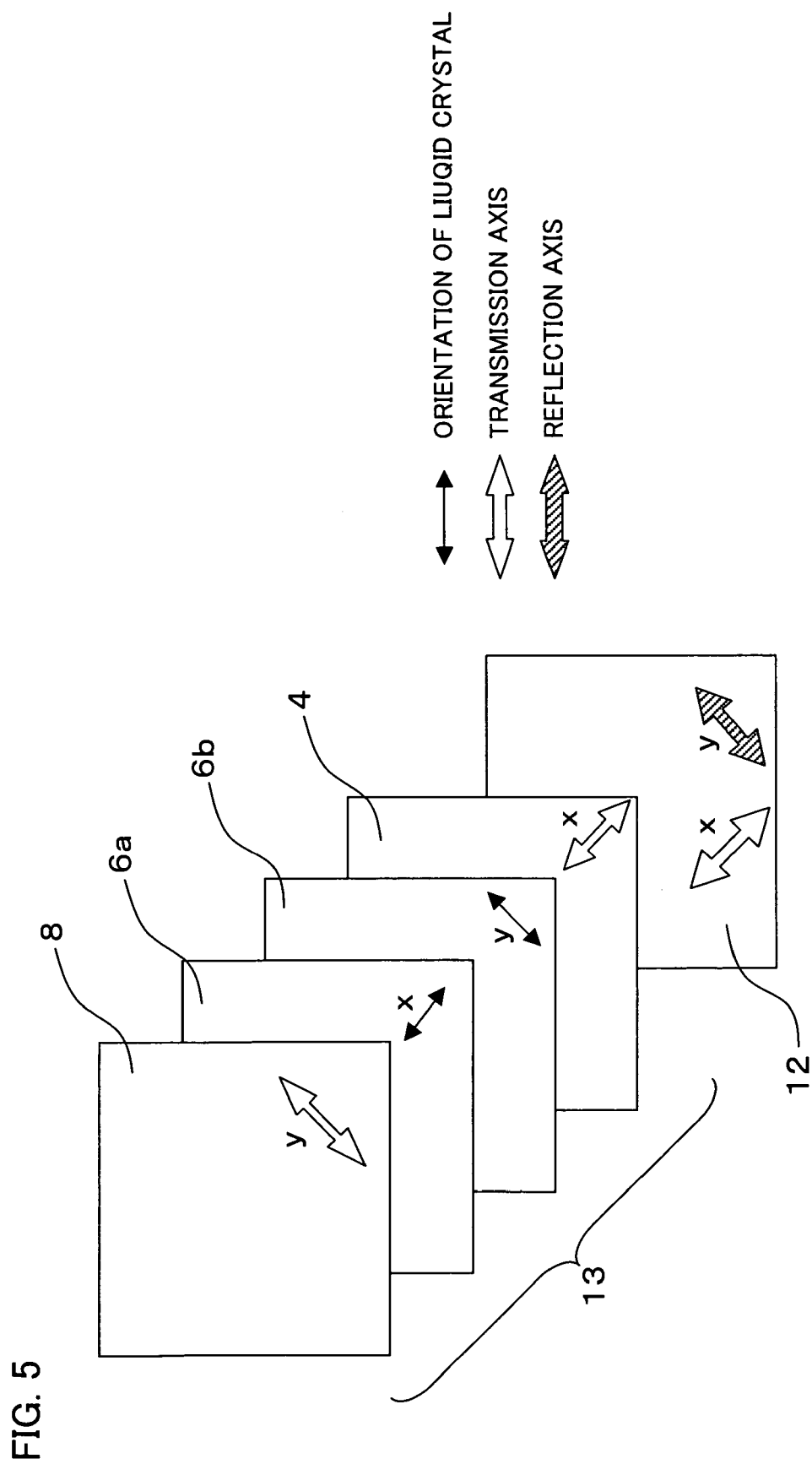
FIG. 5 is an axial design diagram explaining setting of each axis of the liquid crystal display device illustrated in FIG. 2.

Here, the following describes with reference to FIG. 5, an axial configuration (a configuration of the transmission axis, the reflection axis, and the orientation direction of the liquid crystal layer) of the members for controlling the polarization in the LCD device 100. The members are, for example, the polarization selective reflection plate 12, the first polarizing plate 4, the liquid crystal layer 6, and the second polarizing plate 8. A white arrow in FIG. 5 indicates the transmission axis of the polarizing plate. Further, the reference symbols 6a and 6b respectively indicates a liquid crystal molecule layer on the front surface side of the liquid crystal layer 6, and a liquid crystal molecule layer on the back surface side of the liquid crystal layer 6. The solid arrow indicates orientation direction of a liquid crystal molecule.

As illustrated in FIG. 5, the liquid crystal display panel 13 has a configuration such that the first polarizing plate 4 and the second polarizing plate 8 interpose the liquid crystal layer 6. The liquid crystal layer 6 has a TN orientation which is twisted by 90° in the thickness direction.

Further, the respective transmission axes of the first polarizing plate 4 and the second polarizing plate 8 are perpendicularly crossing each other. Further, the transmission axis of the polarization selective reflection plate 12 is set so that the direction of the transmission axis coincide with that of the first polarizing plate 4. Further, the reflection axis of the polarization selective reflection plate 12 is set so that the transmission axis perpendicularly cross this transmission axis.

With this configuration, the surrounding light which is incident on the back surface of the polarization selective reflection plate 12 is able to pass through the first polarizing plate 4, with little loss. This allows sufficient visibility even under strong surrounding light.

For example, under the direct sunlight (60000 lux), a contrast of a conventional transmissive LCD device dropped to 10 or less. This is because the luminance of light from the backlight of the conventional transmissive LCD is not sufficient for prevailing reflection from the front surface of the liquid crystal display panel. On the contrary, since the LCD device 100 of the present embodiment uses light entering from the back surface, a contrast of 20 or more is obtained. Thus, beautiful displaying of an image was confirmed. Further, the polarization selective reflection plate 12 is arranged at the outermost on the back surface side of the LCD device 100. This prevents a displayed item from being viewed from the back surface. Thus, it is confirmed that privacy is securely protected.

Figure 1:
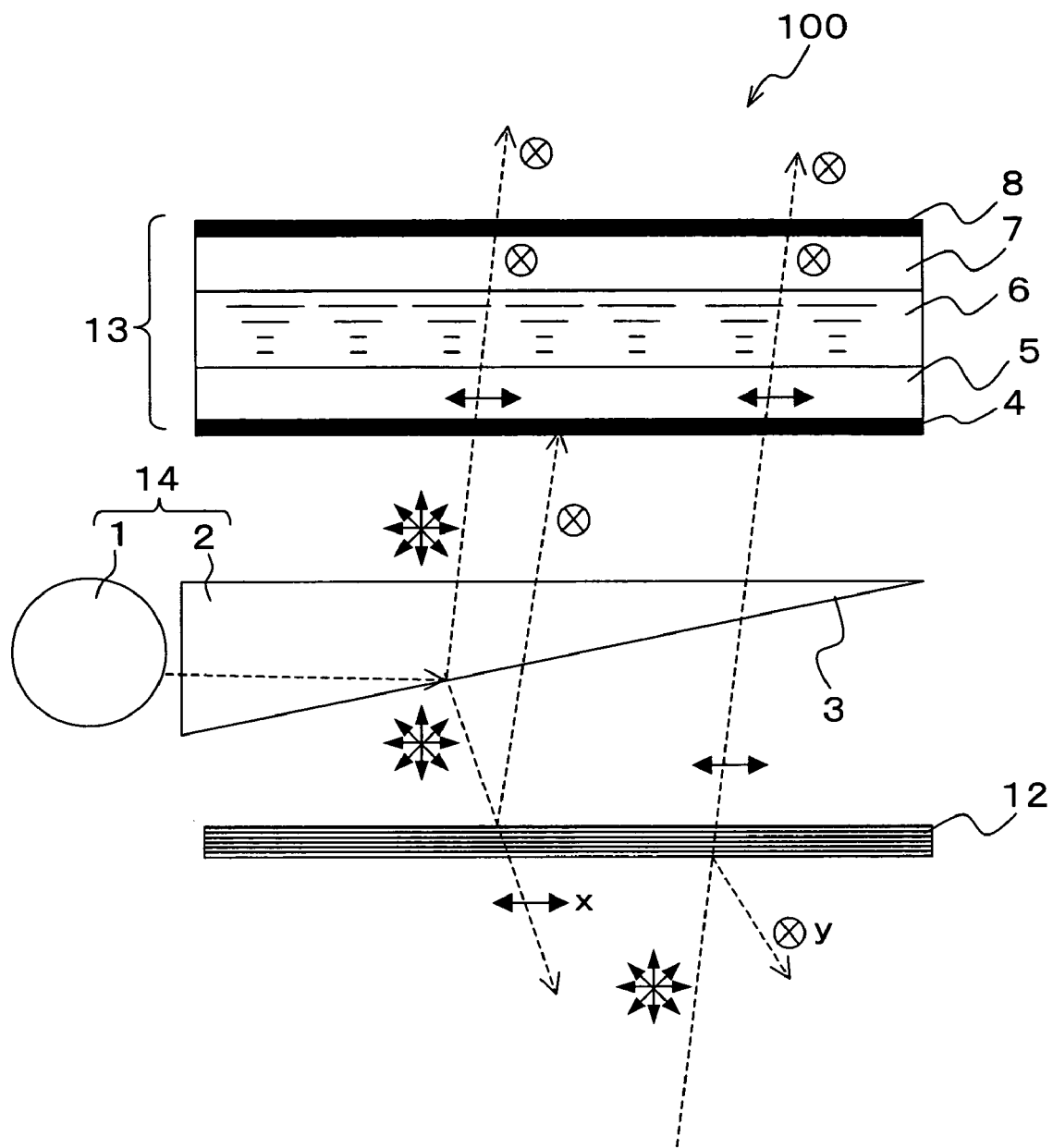
FIG. 1 is an operation diagram illustrating a displaying method of a liquid crystal display device of Embodiment 1 in accordance with the present invention.

Next described with reference to FIG. 1 is a displaying method, assuming that the liquid crystal layer 6 is a TN layer. FIG. 1 is a cross sectional view illustrating schematic configuration of the LCD device 100 of the present embodiment, and illustrates how a screen displaying is performed. Here, as described below, an axial configuration of the first polarizing plate 4, the second polarizing plate 8, and the polarization selective reflection plate 12 is determined to be in a direction parallel to the surface of the paper (Hereinafter, x-direction (x-direction in FIG. 5)), or determined to be in a direction perpendicular to the surface of the paper (Hereinafter, y-direction (y-direction in FIG. 5)).

As illustrated in FIG. 1, the transmission axis of the first polarizing plate 4 is set in the x-direction (first polarization status), and the transmission axis of the second polarizing plate 8 is set in the y-direction (second polarization status). Further, the reflection axis of the polarization selective reflection plate 12 is set in the y-direction, and the transmission axis of the polarization selective reflection plate 12 is set in the x-direction.

The LCD device 100 is capable of using, in the screen displaying, the light emitted from the backlight 14, and the surrounding light incident on the back surface.

First, the following describes a motion of the surrounding light (non-polarized light) incident on the back surface of the LCD device 100. In FIGS. 1, 8, 9, 12 and 13, the two-way arrow, 8-direction arrow, circled symbol "x" respectively indicate polarization statuses. More specifically, the two-way arrow indicates a polarization in the x-direction, and the 8-direction arrow indicates the light which is not polarized. Further, the circled "x" indicates a polarization in the y-direction. As illustrated in FIG. 1, y-directional linearly polarized light of the surrounding light incident on the back surface of the LCD device 100 is reflected by the polarization selective reflection plate 12, and x-directional linearly polarized light of the surrounding light incident on the back surface of the LCD device 100 is transmitted. The x-directional linearly polarized light (first linearly polarized light) having been transmitted through the polarization selective reflection plate 12 reaches the liquid crystal display panel 13. The x-directional linearly polarized light passes the first polarizing plate 4, without changing the polarization direction of the x-directional linearly polarized light. Then, in the liquid crystal layer 6, the polarization direction of the x-directional linearly polarized light is rotated by 90°, and the x-directional linearly polarized light is converted into the y-directional linearly polarized light (second linearly polarized light). Further, the light passes through the second polarizing plate 8 without changing its polarization direction, and reaches an eye of a viewer.

As described, the y-directional linearly polarized light of the surrounding light (non-polarized light) incident on the back surface of the LCD device 100 is reflected from the polarization selective reflection plate 12. Accordingly, when the viewer look at the LCD device 100 from its back surface side, the viewer can only see a reflection as in the case of a looking into a mirror. Accordingly, the viewer is not able to confirm, from the back surface side of the LCD device 100, what is being displayed. This is advantageous in protecting the privacy.

Further, the polarization selective reflection plate 12 transmits only the x-directional linearly polarized light of the surrounding light. The light having been transmitted is used in the screen displaying performed in the LCD device 100. Thus, it is possible to efficiently use, in the screen displaying, the surrounding light being incident on the back surface of the LCD device 100. In other words, it is possible to realize an LCD device which allows a good screen displaying, even under a strong surrounding light environment.

Next described is a motion of the light emitted from the backlight 14. As described, the light from the backlight 14 is scattered by the scattering-finish surface 3 formed on the light-guiding plate 2, and is divided into light traveling in the upward direction, and light traveling in the downward direction. The light travelling in the upward direction reaches the liquid crystal display panel 13, and the light traveling in the downward direction reaches the polarization selective reflection plate 12.

The light (non-polarized light) travelling in the upward direction passes through the first polarizing plate 4, and becomes the x-directional linearly polarized light. Further, in the liquid crystal layer 6, the polarization direction is rotated by 90° so that the linearly polarized light is converted into the y-directional linearly polarized light. Then, the light is transmitted through the second polarizing plate 8 without changing its polarization direction, and reaches the viewer.

On the other hand, the y-directional linearly polarized light of the light travelling in the downward direction (non-polarized light) is reflected from the polarization selective reflection plate 12, and reaches the liquid crystal display panel 13. Further, the x-directional linearly polarized light is transmitted through the polarization selective reflection plate 12, and is emitted from the back surface side of the polarization selective reflection plate 12. The polarization direction of the reflected y-directional linearly polarized light having reached the liquid crystal display panel 13 is different from the direction of the transmission axis of the first polarizing plate 4. Accordingly, the reflected y-directional linearly polarized light is absorbed by the first polarizing plate 4. Accordingly, the light travelling in the downward direction is not used in the screen displaying.

Here, the reflection axis and the transmission axis of the polarization selective reflection plate 12 are such that the y-directional linearly polarized light is reflected, and the x-directional linearly polarized light is transmitted. However, the present invention is not limited to this. For example, the transmission axis of the polarization selective reflection plate 12 is twisted by an arbitrary angle within a range of 0° to 90° with respect to the y-direction. In this way, it is possible to control how much (i) light from the backlight 14 being reflected by the polarization selective reflection plate 12 is used, or (ii) surrounding light being incident on the back surface of the LCD device 100 is used.

Further, the present embodiment deals with a case of using the polarization selective reflection plate 12 which reflects particular linearly polarized light, and transmits a linearly polarized light which is perpendicular to the particular linearly polarized light. However, the present invention is not limited to this, and it is possible to obtain the same effect by using a circular polarization selective reflection plate which reflects particular circularly polarized light, and transmits circularly polarized light whose rotation is opposite to that of the particular circularly polarized light. In this case, an arbitrary phase contrast is selected by placing a retardation plate between the circular polarization selective reflection plate and the light-guiding plate. This results in the same effect obtained by changing the direction of the transmission axis of the polarization selective reflection plate 12.

Embodiment 2

The following describes another embodiment of the present invention with reference to FIG. 6 to FIG. 9. The same symbols are given to the members that have the same functions as those described in the foregoing embodiment 1, and the descriptions of those members are omitted here as a matter of convenience. Further, the features described in the foregoing embodiment 1 can be applied in combination with the present embodiment.

Figure 6:
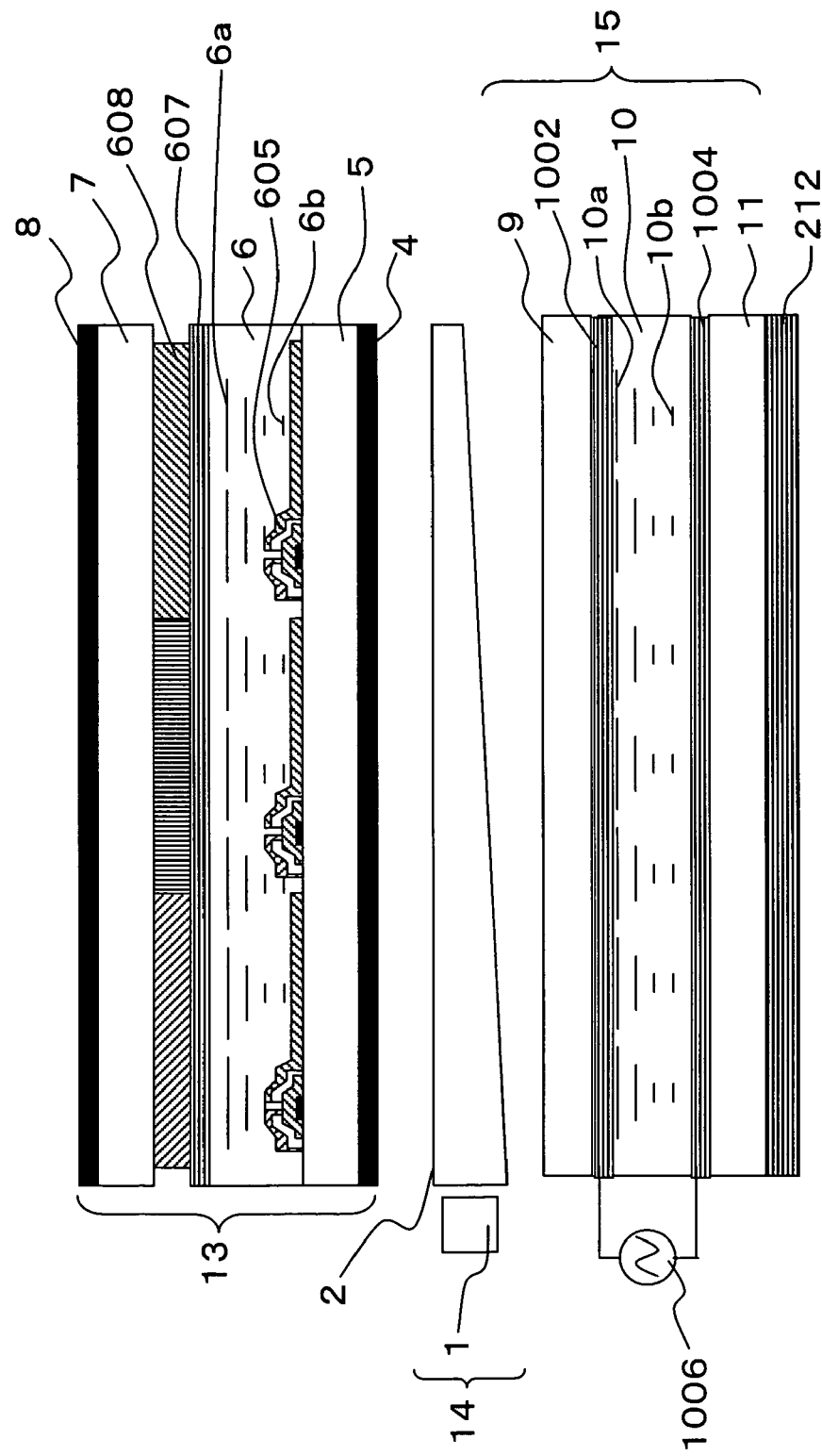
FIG. 6 is a cross sectional view illustrating a configuration of a liquid crystal display device of Embodiment 2 in accordance with the present invention.

FIG. 6 is a cross sectional view illustrating a schematic configuration of a liquid crystal display device (Hereinafter, LCD device) 101 of the present embodiment.

In the LCD device 100 of the embodiment 1, the liquid crystal display panel 13 and the polarization selective reflection plate 12 are arranged across from each other with respect to the backlight 14. On the other hand, in the LCD device 101 of the present embodiment, a polarization control liquid crystal panel 15 is provided on the back surface side of the backlight 14, in addition to the polarization selective reflection plate 212. This configuration allows more effective use of light emitted from the backlight 14.

More specifically, the LCD device 101 includes: a backlight 14 including a light source 1 and a light-guiding plate 2; a liquid crystal display panel (liquid crystal display medium) 13; the polarization control liquid crystal panel (polarization controlling liquid crystal medium) 15; and the polarization selective reflection plate (polarization selective reflection means) 212. The liquid crystal display panel 13 is provided on the front surface side of the backlight 14, and the polarization selective reflection plate 212 is provided on the back surface side of the backlight 14. Further, the polarization control liquid crystal panel 15 is arranged between the backlight 14 and the polarization selective reflection plate 212.

In the configuration, the polarization control liquid crystal panel 15 controls, according to whether or not a driving voltage is applied, a polarization direction of light passing the polarization control liquid crystal panel 15. Thus, the light which is emitted from the backlight 14 in the downward direction can be effectively used in a screen displaying.

The polarization control liquid crystal panel 15 includes: a first transparent substrate 9; a first transparent electrode 1002; a polarization-control-use liquid crystal layer 10; a second transparent electrode 1004; a second transparent substrate 11; and a driving circuit 1006. The polarization-control-use liquid crystal layer 10 is interposed between the first transparent substrate 9 and the second transparent substrate 11. The first transparent substrate 9 is provided on the front surface side of the polarization-control-use liquid crystal layer 10, and the second transparent substrate 11 is provided on the back surface side of the polarization-control-use liquid crystal layer 10.

Further, the first transparent substrate 9 and the second transparent substrate 11 are on contact with the polarization-control-use liquid crystal layer 10, via the first transparent electrode 1002 and the second transparent electrode 1004. Here, the first transparent electrode 1002 and the second transparent electrode 1004 are provided over a region including at least a screen display region of the surface of the liquid crystal display panel 13, and the entire polarization-control-use liquid crystal layer 10 is simultaneously driven by the driving circuit 1006.

For example, the polarization-control-use liquid crystal layer 10 is made of a TN (Twist Nematic) liquid crystal. In the present embodiment, the polarization-control-use liquid crystal layer 10 performs the following control with respect to the linearly polarized light being incident on the polarization-control-use liquid crystal layer 10. Namely, while no voltage is applied, the polarization-control-use liquid crystal layer 10 causes a rotation of the polarization direction of the linearly polarized light by 90°. While voltage is applied, the polarization-control-use liquid crystal layer 10 causes no rotation of the polarization direction of the linearly polarized light. The liquid crystal layer 10 is not limited to the TN liquid crystal, provided that the liquid crystal layer is made of liquid crystal which is capable of controlling a polarization status of the passing light.

Such liquid crystal may be, for example, parallel-aligned liquid crystal. In this case, by setting a phase contrast at $\lambda/2$, the linearly polarized light can be twisted by 90°, as in the case of using the TN liquid crystal. Further, when a voltage is applied for orienting the liquid crystal molecules perpendicularly to the substrate, the phase contrast is resolved and the polarization axis of the passing light is not varied. Thus, the same operation can be carried out, as in the case of using the TN liquid crystal, even if the parallel-aligned liquid crystal is used.

Figure 7:
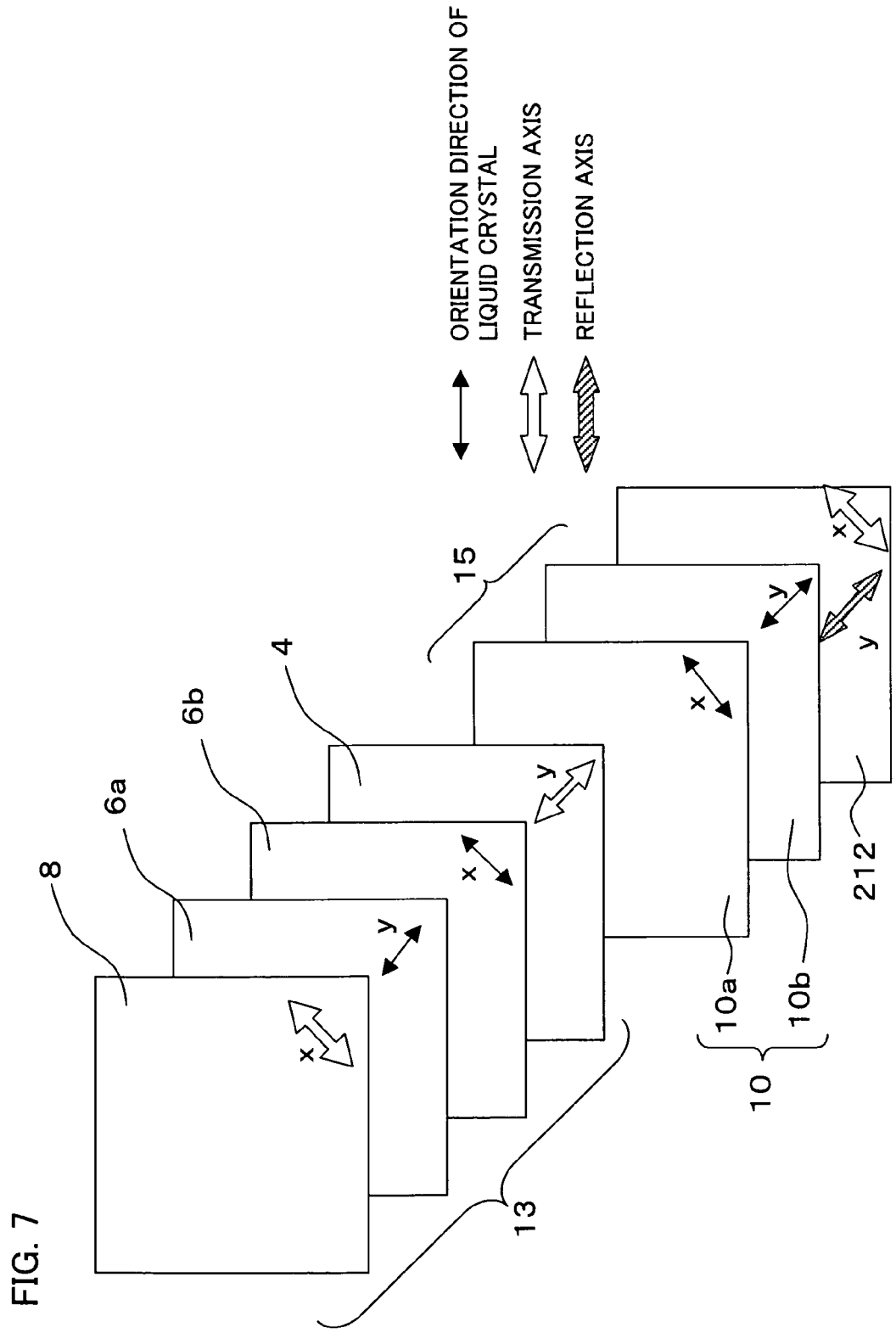
FIG. 7 is an axial design diagram explaining setting of each axis of the liquid crystal display device illustrated in FIG. 6.

Next, FIG. 7 illustrates an axial configuration of members for use in controlling polarization direction in the LCD device 101. The members illustrated in FIG. 11 for use in controlling the polarization direction are, for example, the liquid crystal display panel 13, the polarization-control-use liquid crystal layer 10, and the polarization selective reflection plate 212. The axial configuration of the liquid crystal display panel 13 is the same as that of the foregoing embodiment 1. Accordingly, the following describes the axial configuration of the polarization-control-use liquid crystal layer 10 and that of the polarization selective reflection plate 212.

Here, the reference symbols 10a and 10b respectively indicate a liquid crystal molecule layer on the front surface side of the polarization-control-use liquid crystal layer 10, and that on the back surface side of the same. As illustrated in FIG. 7, the polarization-control-use liquid crystal layer 10 has a TN orientation which is twisted by 90°, in the thickness direction.

Further, a transmission axis of the polarization selective reflection plate 212 perpendicularly crosses that of the first polarizing plate 4. Further, a reflection axis of the polarization selective reflection plate 212 perpendicularly crosses the transmission axis of the polarization selective reflection plate 212. Here, D-BEF film produced by Sumitomo 3M is used as the polarization selective reflection plate 212 of the LCD device 101. However, the polarization selective reflection plate 212 is not limited to this, and the polarization selective reflection plate 212 may be a wire-grid polarizing plate which is an Al thin film having a slit whose width is ¼ wavelength or less. Further, the axial configuration of the polarization selective reflection plate 212 is not limited to this and the transmission axis may be parallel to the transmission axis of the first polarizing plate 4.

With the above described setting of the axial configuration, the polarization-control-use liquid crystal layer 10, while no voltage is applied thereto, twists, by 90°, the linearly polarized light of the surrounding light having been transmitted through the polarization selective reflection plate 212, thereby causing a transmission axis of the linearly polarized light to coincide with the transmission axis of the first polarizing plate 4. Since the linearly polarized light of the surrounding light can be transmitted through the first polarizing plate 4 with little loss, sufficient visibility is obtained even under a strong surrounding light environment.

For example, under the direct sunlight (60000 lux), a contrast of a conventional transmissive LCD device dropped to 10 or less. This is because the luminance of light from the backlight of the conventional transmissive LCD is not sufficient for prevailing reflection from the surface of the liquid crystal display panel. On the contrary, since the LCD device 101 of the present embodiment uses the surrounding light entering from the back surface, a contrast of 20 or more is obtained. Thus, it is possible to provide a liquid crystal display device which allows beautiful displaying of an image even under a sufficiently strong surrounding light environment.

However, in this case, later-described light emitted from the backlight 14 in the downward direction cannot be effectively used. Accordingly, the contrast becomes darker than the conventional transmissive LCD device, under a relatively weak surrounding light environment such as an indoor environment or the like.

In view of that, a sufficiently large voltage is applied to the polarization-control-use liquid crystal layer 10, so that the liquid crystal molecules of the polarization-control-use liquid crystal layer 10 are oriented perpendicularly to the substrate. This prevents a variation in the polarization status of the light passing through the polarization-control-use liquid crystal layer 10.

In this case, the light from the light-guiding plate 2 which has been reflected from the polarization selective reflection plate 212 is transmitted through the polarization-control-use liquid crystal layer 10, without varying the polarization status, and reaches the first polarizing plate 4. Accordingly, the light from the light-guiding plate 2 can be most efficiently used. Further, it is confirmed that the brightness of the screen display at this point was at all the same as the brightness of the conventional transmissive LCD device.

In the above described are: the case where the sufficiently large voltage is applied to the polarization control liquid crystal panel 15; and the case where no voltage is applied to the polarization control liquid crystal panel 15. However, it is possible to apply a medium voltage for continuously switching over between a mode which uses the surrounding light, and a mode which uses the light emitted from the back surface of the light-guiding plate.

Further, the polarization selective reflection plate 212 is arranged at the outermost on the back surface side of the LCD device 101. This prevents a displayed item from being viewed from the back surface. Thus, it is possible to securely protect privacy.

Figure 8:
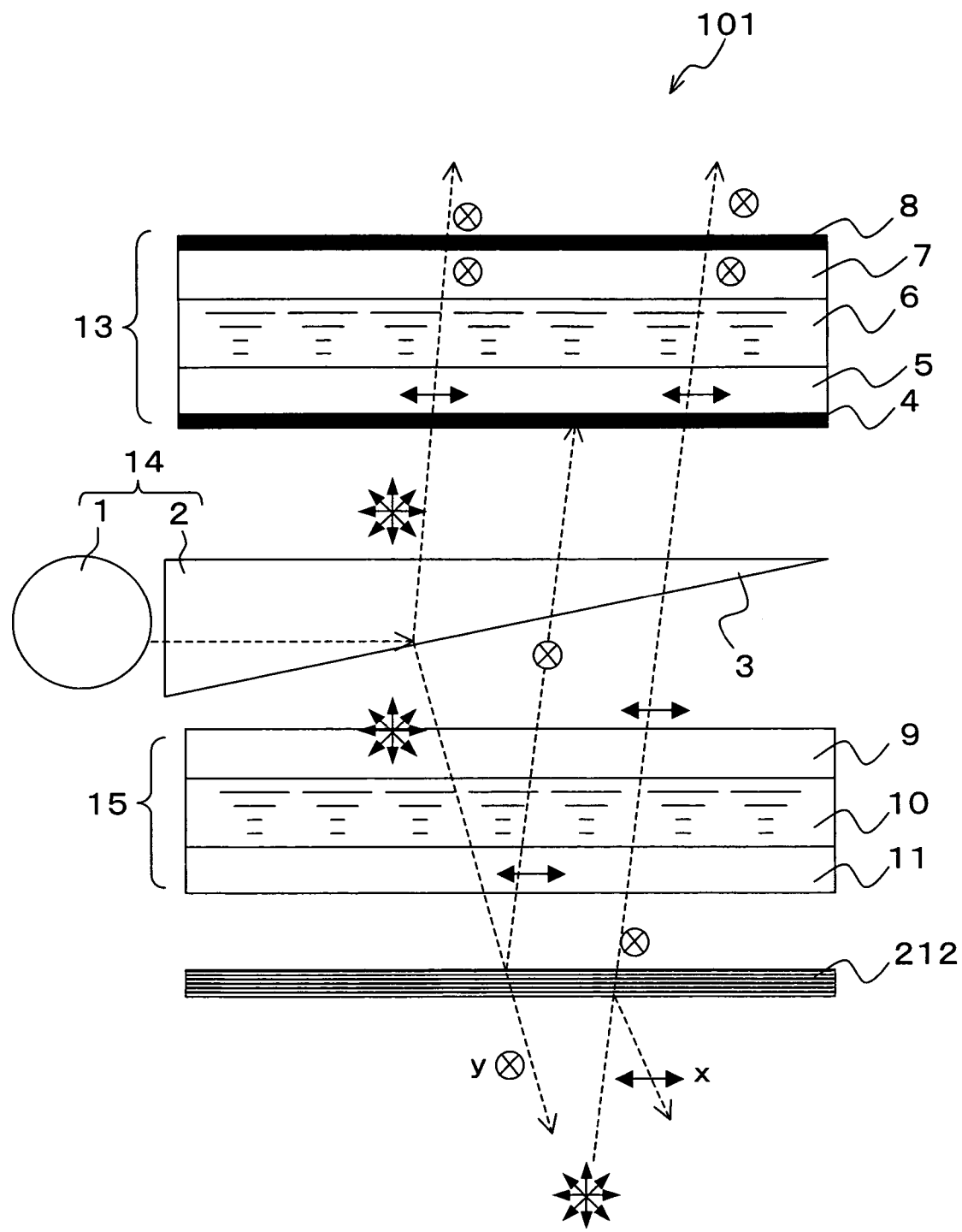
FIG. 8 is an operation diagram explaining a displaying method of the liquid crystal display device of Embodiment 2 in accordance with the present invention, the method carried out under an environment where surrounding light is not so strong.
Figure 9:
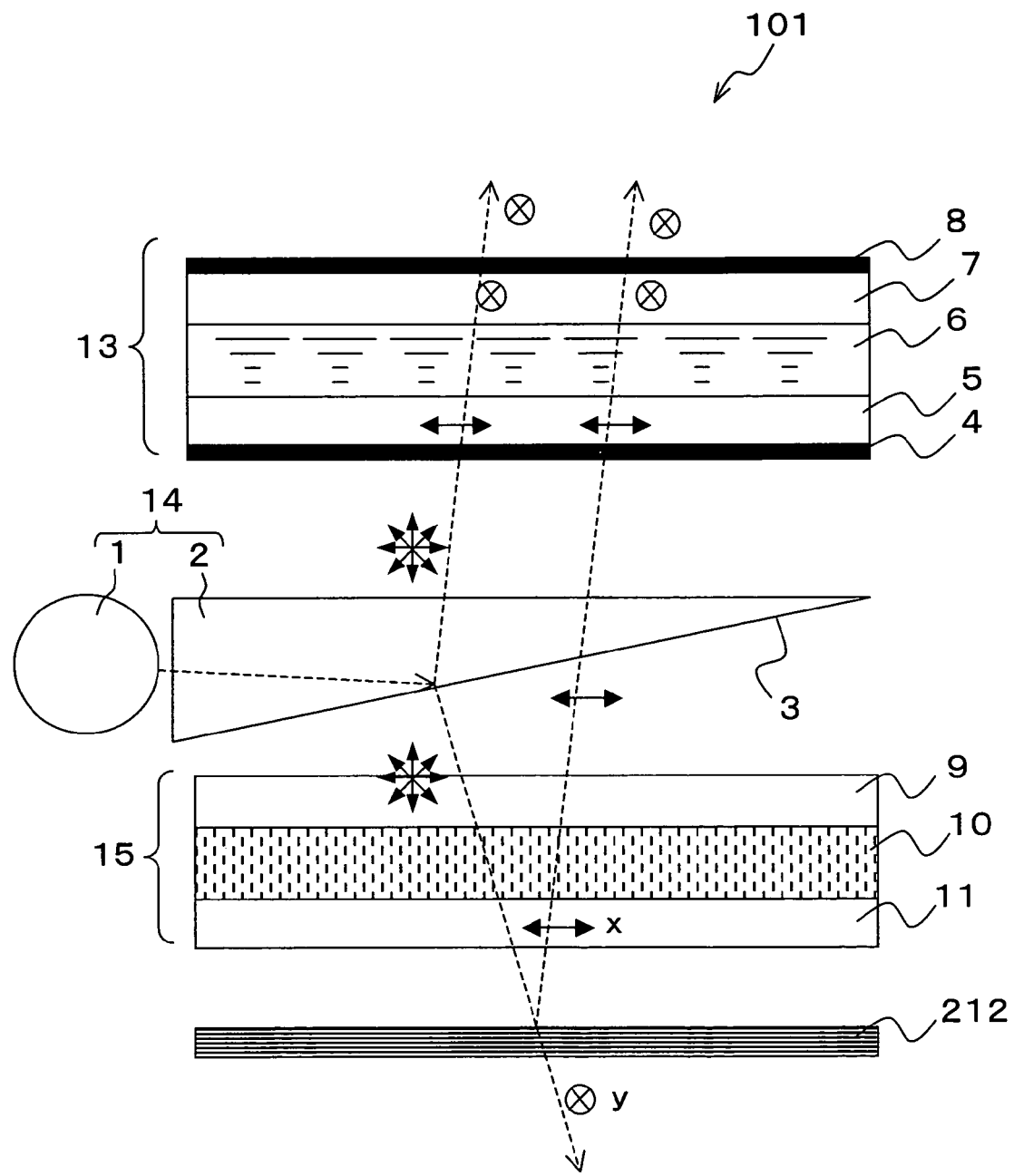
FIG. 9 is an operation diagram explaining a displaying method of the liquid crystal display device of Embodiment 2 in accordance with the present invention, the method carried out under a strong surrounding light environment.

Next described in detail with reference to FIG. 8 and FIG. 9 is a displaying method, assuming that the liquid crystal layer 6 and the polarization-control-use liquid crystal layer 10 are the TN layers. Here, the axial configuration of the polarization selective reflection plate 212 is such that x-directional linearly polarized light is reflected, and y-directional polarized light is transmitted.

First described, with reference to FIG. 9, is a case of effectively using the light emitted from the light source 1 under an indoor environment or the like, where the surrounding light is not so strong.

As described, the light from the light source 1 is scattered by the scattering-finish surface 3 formed on the light-guiding plate 2, and is divided into light (non-polarized light) traveling in the upward direction, and light (non-polarized light) traveling in the downward direction.

The light emitted in the upward direction reaches the liquid crystal display panel 13. When the light passes the first polarizing plate 4, only the x-directional polarized light is selectively transmitted. The liquid crystal layer 6 twists the x-directional polarized light by 90°, so as to convert the x-directional polarized light into the y-directional polarized light. The y-directional polarized light passes through the second polarizing plate 8, and reaches a viewer.

On the other hand, the light emitted in the downward direction passes through the polarization control liquid crystal panel 15, and reaches the polarization reflection plate 212. Then, in the polarization selective reflection plate 212, only the x-directional linearly polarized light is reflected. The liquid crystal molecules of the polarization-control-use liquid crystal layer 10 are perpendicularly oriented by the voltage applied to the polarization control liquid crystal panel 15, so that the x-directional linearly polarized light having been reflected is transmitted, without changing its polarization direction, through the polarization control liquid crystal panel 15, and reaches the liquid crystal display panel 13. Then, the light is transmitted through the first polarizing plate 4 without loss, and reaches the viewer, via the liquid crystal layer 6 and the second polarizing plate 8. As described, with the application of a voltage to the polarization control liquid crystal panel 15, the light emitted in the downward direction can be effectively used in the screen displaying process.

Next described with reference to FIG. 8 is how to effectively use, under a strong surrounding light environment, the surrounding light entering from the back surface. Under the environment, the surrounding light entering from the back surface is effectively used in the screen displaying, by applying no voltage to the polarization control liquid crystal panel 15.

Light emitted from the light source 1 enters the light-guiding plate 2. Then, the light is scattered by the scattering-finish surface 3 formed on the light-guiding plate 2, and is emitted in the upward direction and downward direction. The light emitted in the upward direction reaches a first liquid crystal display panel 13 for use in displaying an image. Then, only the x-directional linearly polarized light is selectively transmitted through the first polarizing plate 4. In the liquid crystal layer 6, the polarization direction of the x-directional linearly polarized light is twisted by 90° so that the x-directional linearly polarized light is converted into the y-directional linearly polarized light. Then, the y-directional linearly polarized light passes through the second polarizing plate 8, and reaches the viewer.

The light emitted in the downward direction passes through the polarization control liquid crystal panel 15, and reaches the polarization selective reflection plate 212. No voltage is applied to the polarization control liquid crystal panel 15, so that the polarization-control-use liquid crystal layer 10 is the TN liquid crystal. Accordingly, when the x-directional linearly polarized light having been reflected from the polarization selective reflection plate 212 passes through the polarization-control-use liquid crystal layer 10, the x-directional linearly polarized light is twisted by 90° and is converted into the y-directional linearly polarized light. This y-directional linearly polarized light is absorbed in the first polarizing plate 4. As such, the light emitted in the downward direction is not used in the screen displaying.

On the other hand, the surrounding light entered from the back surface side of the polarization selective reflection plate 212 is converted into the y-directional linearly polarized light, when the surrounding light passes through the polarization selective reflection plate 212. This y-directional linearly polarized light is twisted by 90° when it passes through the polarization control liquid crystal panel 15, and is converted into the x-directional linearly polarized light. Then, this light passes through the first polarizing plate 4 of the liquid crystal display panel 13 without loss, and reaches the viewer via the liquid crystal layer 6 and the second polarizing plate 8. As described, by applying no voltage to the polarization control liquid crystal panel 15, it is possible to realize an LCD device 101 which is capable of performing a good screen displaying even under the strong surrounding light environment.

As described, with the provision of the polarization control liquid crystal panel 15 which controls a polarization direction of light by applying or not applying a voltage, it is possible to realize a liquid crystal display device which is capable of effectively using, in a screen displaying, the light from the light source 1, even under an environment where the surrounding light is not so strong.

Further, an axial configuration of the polarization selective reflection plate 212 is set so that the x-directional linearly polarized light is reflected and the y-direction polarized light is transmitted. However, the present invention is not limited to this, and the axial configuration may be set so that the y-directional linearly polarized light is reflected, and the x-direction polarized light is transmitted.

In this case, the foregoing liquid crystal display device which is capable of effectively using the light from the light source 1 can be realized by: (i) applying, under a strong surrounding light environment, a drive voltage to the polarization-control-use liquid crystal layer 10; and (ii) applying no voltage under an environment where the surrounding light is not so strong.

Embodiment 3

The following describes yet another embodiment of the present invention with reference to FIG. 10 to FIG. 13. The same symbols are given to the members that have the same functions as those described in the foregoing embodiments 1 and 2, and the descriptions of those members are omitted here as a matter of convenience. Further, the features described in the foregoing embodiments 1 and 2 can be applied in combination with the present embodiment.

The embodiment 1 and 2 deal with a case of using the polarization selective reflection plate which transmits or reflects linearly polarized light. However, the same goes for a case of using a different polarization selective reflection plate. The present embodiment deals with a case of using a polarization selective reflection plate which transmits or reflects circularly polarized light.

Figure 10:
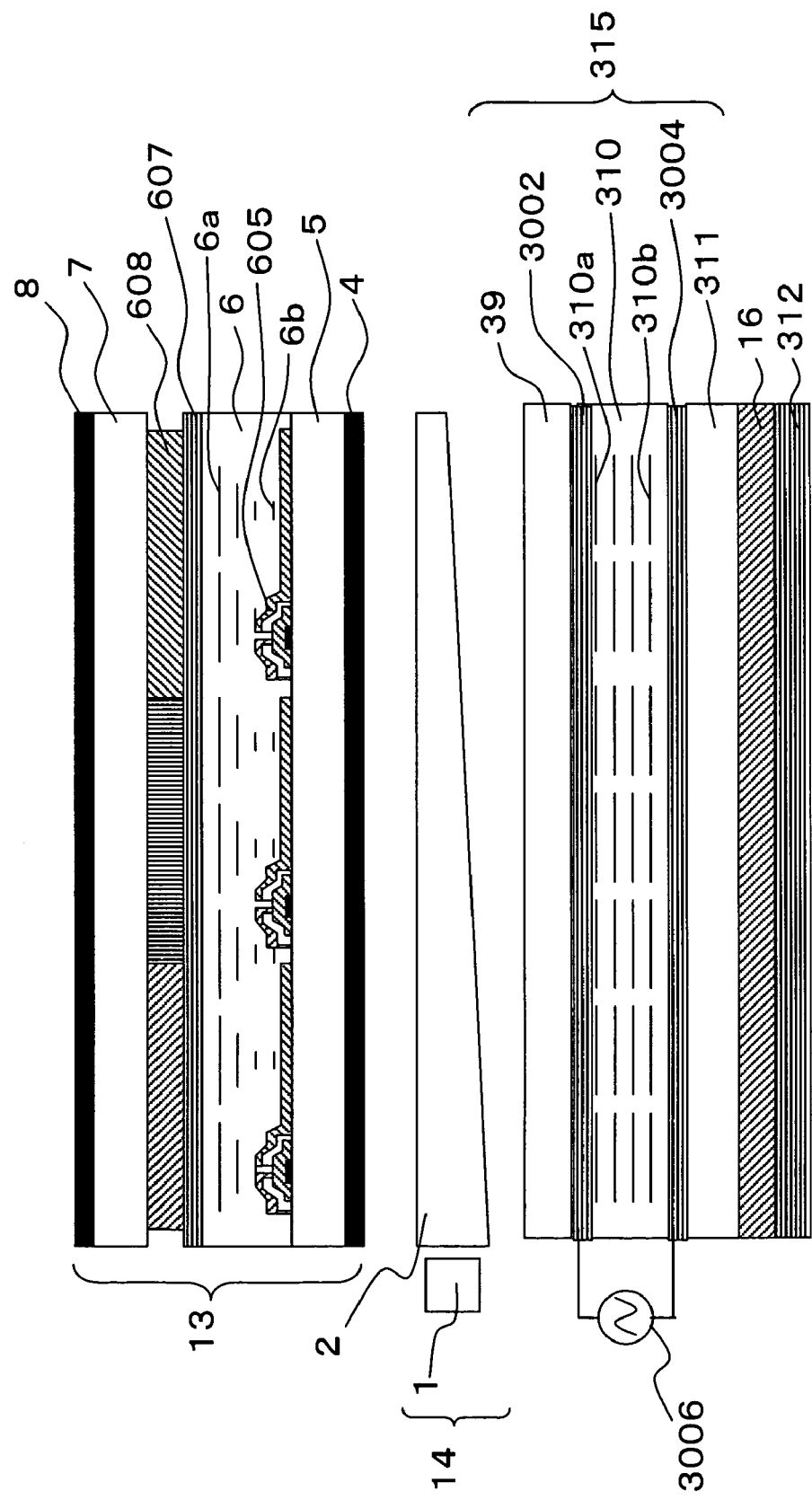
FIG. 10 is a cross sectional view illustrating a configuration of a liquid crystal display device of Embodiment 3 in accordance with the present invention.

FIG. 10 is a cross sectional view of a liquid crystal display device (Hereinafter, LCD device) 102. The LCD device 102 includes: a liquid crystal display panel 13; a light source 1; a light-guiding plate 2; a polarization control liquid crystal panel 315; a retardation plate 16; and a polarization selective reflection plate 312. The light source 1 and the light-guiding plate 2 forms a backlight 14. The polarization selective reflection plate 312 is provided at the outermost on the back surface side of the backlight 14. From the polarization selective reflection plate 312 towards the backlight 14, the retardation plate 16 and the polarization control liquid crystal panel 315 are provided in this order.

The polarization control liquid crystal panel 315 includes: a first transparent substrate 39; a first transparent electrode 3002; a polarization-control-use liquid crystal layer 310; a second transparent electrode 3004; a second transparent substrate 311; and a drive circuit 3006. The polarization-control-use liquid crystal layer 310 is interposed between the first transparent substrate 39 and the second transparent substrate 311. The first transparent substrate 39 is provided on the front surface side of the polarization-control-use liquid crystal layer 10 and the second transparent substrate 311 is provided on the back surface side of the polarization-control-use liquid crystal layer 10.

Further, the first transparent substrate 39 and the second transparent substrate 311 are on contact with the polarization-control-use liquid crystal layer 310, via the first transparent electrode 3002 and the second transparent electrode 3004. Here, the first transparent electrode 3002 and the second transparent electrode 3004 are provided over a region including at least a screen display region of the surface of the liquid crystal display panel 13, and the entire polarization-control-use liquid crystal layer 310 is simultaneously driven by the driving circuit 3006.

The polarization-control-use liquid crystal layer 310 is a parallel-aligned nematic liquid crystal layer whose retardation is approximately $\lambda/2$ ($\Delta n \cdot d = 220$ nm, where: $\Delta n$ is a refraction index of the liquid crystal; and d is a cell thickness of the liquid crystal.)

The retardation plate 16 converts, into linearly polarized light, the circularly polarized light incident on the back surface side.

Further, the polarization selective reflection plate 312 reflects right-circularly polarized light having entered, and transmits left-circularly polarized light having entered. In the LCD device 103, PCF film produced by Nitto Denko Corporation is used as the polarization selective reflection plate 312. However, the present invention is not limited to this. For example, it is possible to adopt a cholesteric liquid crystal polymer in which cholesteric liquid crystal is dispersed into a macromolecule. Further, the polarization selective reflection plate 312 may be a polarization selective reflection plate which reflects the left-circularly polarized light and transmits the right-circularly polarized light.

Figure 11:
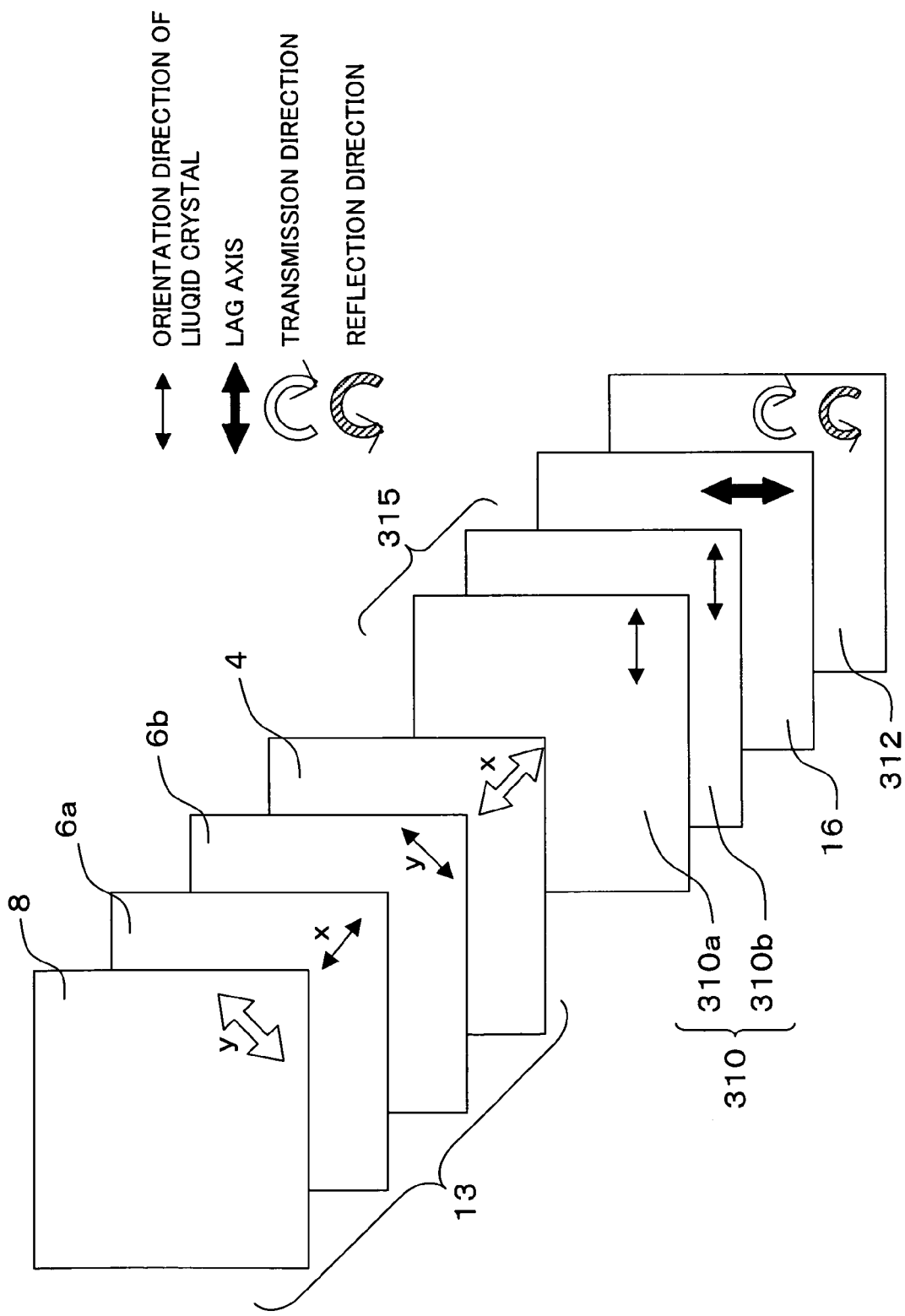
FIG. 11 is an axial design diagram explaining setting of each axis of the liquid crystal display device illustrated in FIG. 10.

Next, FIG. 11 illustrates an axial configuration of members for use in controlling polarization direction in the LCD device 102. The members for use in controlling the polarization direction are, for example, the liquid crystal display panel 13, the polarization-control-use liquid crystal layer 310, the retardation plate 16, and the polarization selective reflection plate 312. The axial configuration of the liquid crystal display panel 13 is the same as that of the foregoing embodiments 1 and 2. Accordingly, the following describes the axial configuration of the polarization-control-use liquid crystal layer 310, the retardation plate 16, and the polarization selective reflection plate 312.

Here, the reference symbols 310a and 310b respectively indicate a liquid crystal molecule layer on the front surface side of the polarization-control-use liquid crystal layer 310, and that on the back surface side of the same. As illustrated in FIG. 11, the polarization-control-use liquid crystal layer 310 has the parallel-alignment which is not twisted in the thickness direction, and an orientation direction of the polarization-control-use liquid crystal layer 310 is set so that the orientation direction, which is twisted to the right by 45°, corresponds to a transmission axis of the first polarizing plate 4.

Further, the retardation plate 16 is set so that its lag axis is twisted by 90° with respect to the orientation direction of the polarization-control-use liquid crystal layer 310, and that its retardation is λ/4.

The polarization selective reflection plate 312 arranged is a polarization selective reflection plate whose transmission rotative direction is toward the left.

With this configuration, while no voltage is applied to the polarization-control-use liquid crystal layer 310, the left-circular linearly polarized light which is incident on the back surface side of the polarization selective reflection plate 312 is converted, in the retardation plate 16, into the linearly polarized light which is perpendicular to the transmission axis of the first polarizing plate 4. Then, in the polarization-control-use liquid crystal layer 310, the linearly polarized light is further converted into the linearly polarized light which is parallel to the transmission axis of the first polarizing plate 4. Since the linearly polarized light is parallel to the transmission axis of the first polarizing plate 4 can be transmitted through the first polarizing plate 4 with little loss, sufficient visibility is obtained even under a strong surrounding light environment.

For example, under the direct sunlight (60000 lux), a contrast of a conventional transmissive LCD device dropped to 10 or less. This is because the luminance of light from the backlight of the conventional transmissive LCD is not sufficient for prevailing reflection from the surface of the liquid crystal display panel. On the contrary, since the LCD device 103 of the present embodiment uses the light entering from the back surface, a contrast of 50 or more is obtained. Thus, beautiful displaying of an image was confirmed. However, in this case, light emitted from the light-guiding plate 2 in the downward direction cannot be effectively used. Accordingly, the contrast becomes darker than the conventional transmissive LCD device, under a relatively weak surrounding light environment such as an indoor environment or the like.

In view of that, a sufficiently large voltage is applied to the polarization-control-use liquid crystal layer 310, so as to cause the liquid crystal molecule of the polarization-control-use liquid crystal layer 310 to rise. Thus, no variation occurs in the polarization status of the light passing through the polarization-control-use liquid crystal layer 310. In this case, the right-circularly polarized light of the light emitted in the downward direction from the light-guiding plate 2 is reflected from the polarization selective reflection plate 312, and passes through the retardation plate 16. Thus, the right-circularly polarized light is converted into the linearly polarized light which is parallel to the transmission axis of the first polarizing plate 4. Here, the polarization status does not vary, because the sufficiently large voltage is applied to the polarization-control-use liquid crystal layer 310, thus causing the liquid crystal molecules of the polarization-control-use liquid crystal layer 310 to be perpendicularly oriented. Therefore, the light from the light-guiding plate is most efficiently used. In this case, it is confirmed that the brightness is exactly the same as that of a conventional transmissive LCD device.

In the above described are: the case where the sufficiently large voltage is applied to the polarization-control-use liquid crystal layer 310; and the case where no voltage is applied to the polarization-control-use liquid crystal layer 310. However, it is possible to apply a medium voltage for continuously switching over between a mode of using the surrounding light, and a mode of using the light emitted in the downward direction from the light-guiding plate 2.

Further, the polarization selective reflection plate 312 is arranged at the outermost on the back surface side of the polarization-control-use liquid crystal layer 310. This prevents a displayed item from being viewed from the back surface. Thus, it is possible to securely protect privacy.

Figure 12:
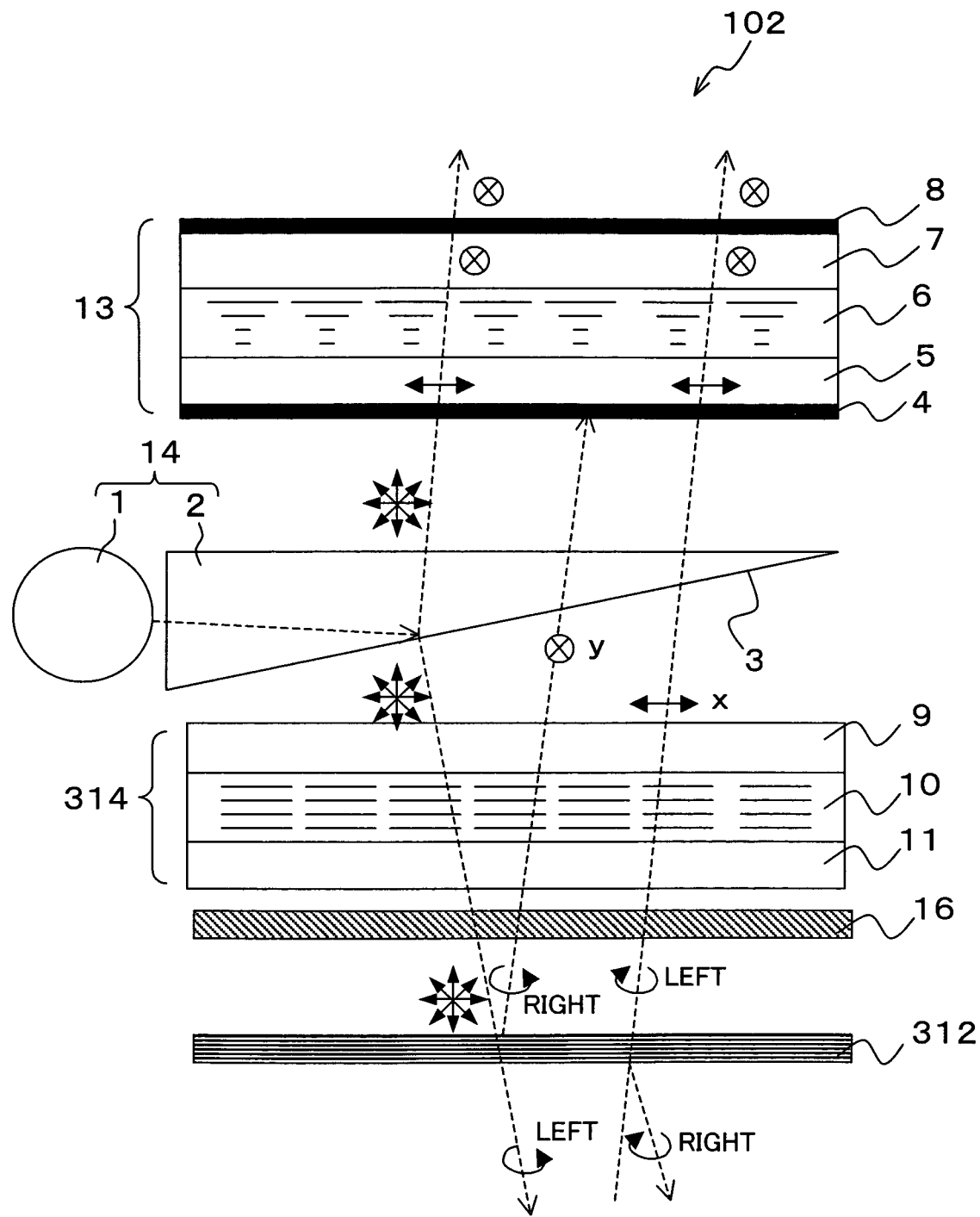
FIG. 12 is an operation diagram explaining a displaying method of the liquid crystal display device of Embodiment 3 in accordance with the present invention, the method carried out under an environment where surrounding light is not so strong.
Figure 13:
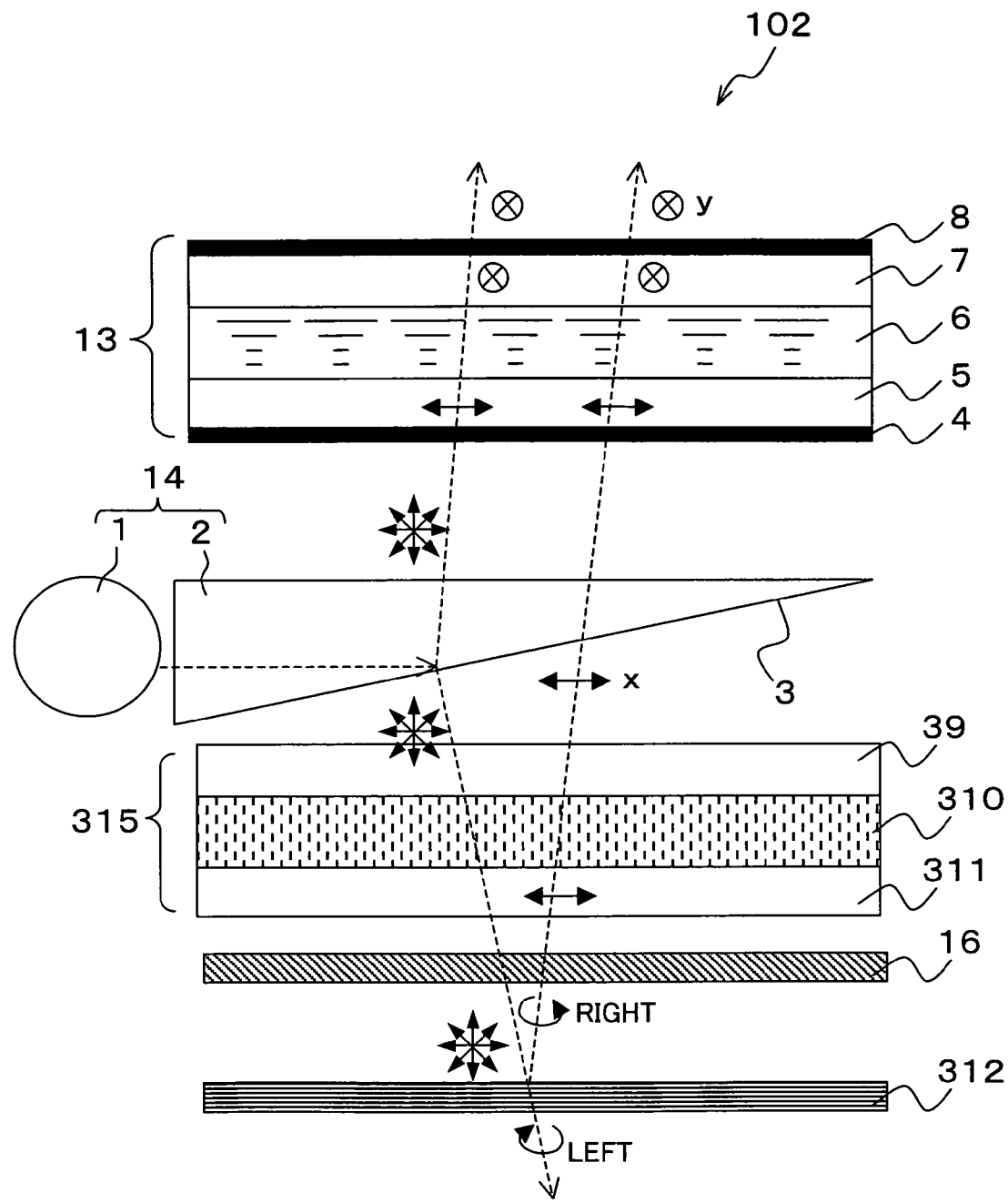
FIG. 13 is an operation diagram explaining a displaying method of the liquid crystal display device of Embodiment 3 in accordance with the present invention, the method carried out under an environment where surrounding light is not so strong.

Next described in detail with reference to FIG. 12 and FIG. 13 is a displaying method carried out in the LCD device 103. Here, the polarization selective reflection plate 312 is such that the right-circularly polarized light is reflected, and the left-circularly polarized light is transmitted.

First described, with reference to FIG. 13, is a case of effectively using the light emitted from the backlight 14 under an indoor environment or the like, where the surrounding light is not so strong.

As already mentioned, when the light emitted in the upward direction from the backlight 14 passes the polarizing plate 4, only the x-directional linearly polarized light is selectively transmitted. The liquid crystal layer 6 twists the x-directional linearly polarized light by 90°, thereby converting the x-directional linearly polarized light into the y-directional linearly polarized light. The y-directional linearly polarized light passes through the polarizing plate 8, and reaches a viewer.

On the other hand, the light emitted in the downward direction reaches the polarization reflection plate 12, via the polarization-control-use liquid crystal layer 310 and the retardation plate 16. The light emitted in the downward direction is still randomly polarized at the time of reaching the polarization selective reflection plate 312. However, the right-circularly polarized light is reflected from the polarization selective reflection plate 312 and the left-circularly polarized light is transmitted. The right-circularly polarized light having been reflected varies its polarization status when it passes through the retardation plate 16. If the retardation plate 16 is set at λ/4 condition, the right-circularly polarized light is converted into the linearly polarized light whose polarization direction corresponds to the direction which has been twisted to the right by 45° with respect to the lag axis of the retardation plate 16. For the simple understanding, it is assumed that the right-circular polarization is converted into the x-directional linearly polarized light.

Further, the liquid crystal molecules of the polarization-control-use liquid crystal layer 310 are oriented in the perpendicular direction by an application of a voltage, so that the x-directional linearly polarized light reaches the liquid crystal display panel 13, without changing its polarization status. Then, the light is transmitted through the first polarizing plate 4 without loss, and reaches the viewer, via the liquid crystal layer 6 and the second polarizing plate 8.

Next described with reference to FIG. 12 is how to effectively use the light entering from the back surface side of the LCD device 103 under a strong surrounding light environment.

The light emitted from the light source 1 directed in the upward direction by the scattering-finish surface 3 of the light-guiding plate 2 reaches the viewer, via the liquid crystal display panel 13, as in the case of FIG. 13.

On the other hand, the light emitted in the downward direction passes through the polarization-control-use liquid crystal layer 310 and the retardation plate 16, and then reaches the polarization selective reflection plate 312. In the retardation plate 16, the right-circularly polarized light having been reflected from the polarization selective reflection plate 312 is converted into the x-directional linearly polarized light.

Further, no voltage is applied to the polarization-control-use liquid crystal layer 310, so that the liquid crystal molecules are the parallel-alignment status. Here, the polarization-control-use liquid crystal layer 310 is set so that (I) the liquid crystal molecules is in the parallel-alignment status, (II) a lag axis of the polarization-control-use liquid crystal layer 310 is perpendicular to that of the retardation plate 16, and (III) the phase contrast is λ/2. With this configuration, the x-directional linearly polarized light is twisted by 90°, when it passes through the polarization-control-use liquid crystal layer 310, and is converted into the y-directional linearly polarized light. The x-directional linearly polarized light is absorbed when it reaches the first polarizing plate 4. Accordingly, the x-directional linearly polarized light is not effectively used.

However, when the surrounding light is transmitted through the polarization selective reflection plate 312, the surrounding light entering from the back surface is converted into the left-circularly polarized light, and is converted into the x-directional linearly polarized light when passing through the retardation plate 16 and the polarization-control-use liquid crystal layer 310. Then, the x-directional linearly polarized light reaches the liquid crystal display panel 13. Thus, it is possible to use the surrounding light without loss.

As described, in the liquid crystal display panel 13 arranged with the first polarizing plate 4, only the x-directional linearly polarized light is used. This prevents a loss, even if the polarization reflection plate 12 arranged on the back surface side only transmits the left-circularly polarized light. Accordingly, it is possible to quite effectively use light.

At this point, in FIGS. 12 and 5, it is possible to use the TN liquid crystal instead of using the parallel-aligned liquid crystal for the polarization-control-use liquid crystal layer 310, and twist the polarization axis by 90° as in the case of using the parallel-aligned liquid crystal. Further, by causing the perpendicular orientation of the liquid crystal molecules with an application of a voltage to the polarization-control-use liquid crystal layer 310, no variation occurs in the polarization direction of the passing light. As described, the use of the TN liquid crystal also allows the same operation as in the case of using the parallel-aligned liquid crystal.

Embodiment 4

The following describes still another embodiment of the present invention with reference to FIG. 10 to FIG. 14. The same symbols are given to the members that have the same functions as those described in the foregoing embodiments, and the descriptions of those members are omitted here as a matter of convenience. Further, the features described in the foregoing embodiments can be applied in combination with the present embodiment.

Figure 14:
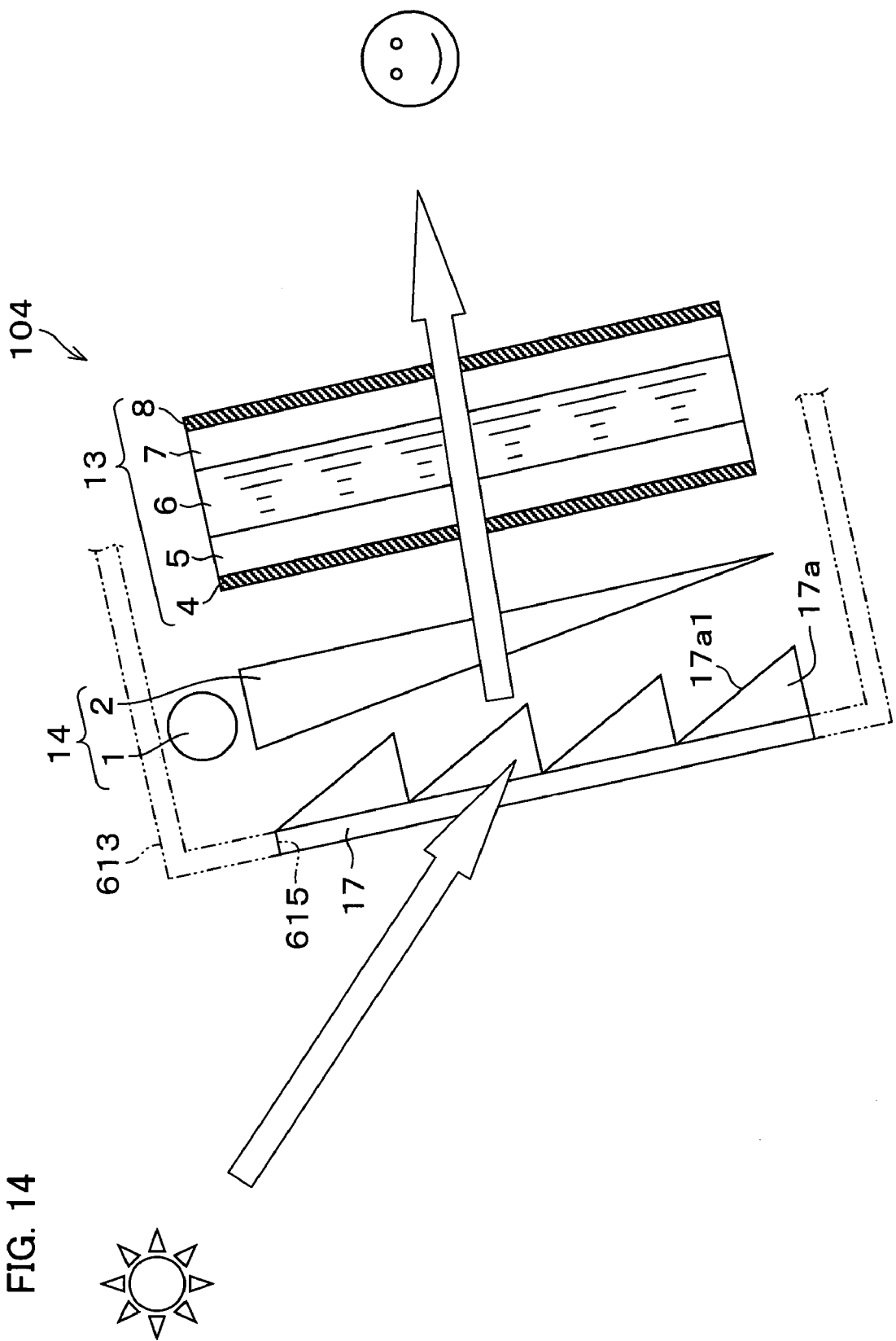
FIG. 14 is a cross sectional view illustrating a configuration of a liquid crystal display device of Embodiment 4 in accordance with the present invention.

FIG. 14 is a cross sectional view of a liquid crystal display device (Hereinafter, LCD device) 104 of the present embodiment. As illustrated in the figure, the LCD device 104 includes, sequentially from the front surface side to the back surfaces side: a liquid crystal display panel (liquid crystal display medium) 13; a backlight 14; the polarization selective reflection plate (polarization selective reflection means) 12 (not shown); and a prism array (light refracting means) 17. The prism array 17 is provided on the outermost on the back surface side of the LCD device 104.

The LCD device 104 is covered its outer surface with a casing (enclosure) 613 illustrated in FIG. 2(b). A light inlet window 616 on the back surface side of the casing 613 is formed in such a size that the entire back surface of the liquid crystal display panel 13 can take in the light. For example, the prism array 17 may be fit in the light inlet window 616 of the casing 613.

The configuration and the function of the LCD device 104 are the same as those of the LCD device 100 described in Embodiment 1, except for the prism array 17 and its function.

Here, when the LCD device 104 is used in a bright environment such as an outdoor environment, the LCD device 104 takes in light from the light inlet window 616 on the back surface of the LCD device 104. Thus, the luminance and the visibility of the LCD device 104 are improved. However, while the liquid crystal display panel 13 is used, the liquid crystal display panel 13 is usually tilted so that the displaying screen faces upward. Accordingly, the back surface for taking in the light faces downward (i.e.; a light entering direction which is perpendicular to the back surface of the LCD device 104 is tilted upward). As a result, the light can not be sufficiently taken in. In view of that, the LCD device 104 is provided with the prism array 17 as described above, so as to take in the light from an upper portion, of the back surface of the LCD device 104, which is exposed to a larger amount of the light. In short, the prism array 17 has a function of refracting light which is incident obliquely from above on the back surface of the LCD device 104 so that the light travels in the direction towards the front surface of the LCD device 104.

For example, the prism array 17 is made of a photorefractive film, and is a transparent substrate having a plurality of prisms 17a. Each of the prisms 17a includes a slanted surface 17a1 which is tilted with respect to the displaying surface of the liquid crystal display panel 13. The refraction index varies before and after this phase interface of the slanted surface 17a1.

In the present embodiment, the prism array 17 is made of a transparent base material whose refraction index is 1.57, and the prism 17a has the slanted surface 17a1 which is tilted at the angle of 22° with respect to a phase interface of the air. This prism array 17 is arranged so that (I) an uneven surface, i.e., the surface on which the prism 17a is formed, faces the liquid crystal display panel 13; and (II) the slanted surface 17a1 faces the upper portion of the LCD device 104.

With the configuration, the light incident obliquely from above on the back surface of the LCD device 104 does not travel straight, but is refracted by the prism array 17 so that the light travels along a line of sight of a viewer who is viewing the LCD device 104; i.e., incident toward the front surface of the LCD device 104.

Illuminance was actually measured under various environments. The result is shown in Table 1. The measurement environments were: an outdoor environment (under direct sunlight); an outdoor environment (in shade); an indoor environment (in room); an indoor environment (in hallway); and an indoor environment (by window). Under each of these environments, the measurement was performed by directing a measuring device upward, sideway, and downward. As a result, when the measuring device was faced upward the illuminance was three to six times larger, under all the environment, than illuminance resulted from the case where the measuring device is faced downward. From this result, it is obvious that the light can be more effectively taken in, by collecting the light entering from the upper direction, rather than taking in the light entering from the lower direction.

TABLE 1

Illuminance Measured under Various Environment

| Measurement Environment | Upward | Sideway | Downward |
|---|---|---|---|
| Outdoor (under Direct Sun Light) | 90000 | 20000 | 10000 to 15000 |
| Outdoor (Shade) | 14000 | 10000 | 5000 |
| Indoor (Room) | 200 to 500 | 100 to 200 | 50 to 100 |

TABLE 1-continued

Illuminance Measured under Various Environment

| Measurement Environment | Upward | Sideway | Downward |
|---|---|---|---|
| Indoor (in Hallway) | 10 to 300 | 10 to 50 | 10 to 50 |
| Indoor (by Window) | 1000 to 1500 | 700 to 1000 | 300 to 400 |

Illuminance/1x

Further, a measurement of the luminance was performed with respect to the front surface of a display device having (i) a configuration with the prism array 17 as in the LCD device 104, or (ii) a configuration without the prism array 17 (i.e., the LCD device 104 without the prism array 17. The difference in the luminance due to the light-inletting effect was particularly remarkable when measured under an outside environment or by the window, and the configuration with the prism array 17 resulted in better luminance and better visibility.

In the present embodiment, the light refracting means is the prism array whose slant angle is 22°, and whose refraction index is 1.57. However, it is essentially possible to adopt, without causing any problems, any light refracting means to the present invention, provided that the light refracting means has a function of refracting the light incident on the back surface of a display device from a direction from which a larger amount of light is obtained so that the light travels in the direction towards the viewer. A material and a shape of the light reflecting means is selected suitably for various conditions. For example, it is possible to adopt a prism array so-called BEF (produced by 3M) having a shape which is different from the prism array illustrated in FIG. 14, or adopt a transmissive hologram diffuser or the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be suitably applied to an active matrix type transmissive liquid crystal display device or the like which needs to perform a good screen displaying even under a strong surrounding light environment.

The invention claimed is:

1. A liquid crystal display device comprising:
a liquid crystal display medium including a pair of first and second polarizing plates; and a liquid crystal layer between the first and second polarizing plates, the second polarizing plate being provided on a display surface side;
polarization selective reflection means, provided on a side of the first polarizing plate so as to face the liquid crystal display medium, for transmitting a light component in a first polarization status of surrounding light incident on a first surface of the polarization selective reflection means opposite to a second surface of the polarization selective reflection means on a side of the liquid crystal display medium, and for reflecting a light component in a second polarization status of the surrounding light incident on the first surface, the second polarization status being different from the first polarization status;
light irradiating means, provided between the polarization selective reflection means and the liquid crystal display medium, for irradiating the liquid crystal display medium with light from a light source; and
an enclosure which covers an outer surface of the liquid crystal display device, the enclosure including (i) a display window on a surface thereof facing to the liquid crystal display medium and (ii) a light inlet window on a surface thereof facing to the polarization selective reflection means of the enclosure.

2. A liquid crystal display device comprising:
a liquid crystal display medium including a pair of first and second polarizing plates; and a liquid crystal layer between the first and second polarizing plates, the second polarizing plate being provided on a display surface side;
polarization selective reflection means, provided on a side of the first polarizing plate so as to face the liquid crystal display medium, for transmitting a light component in a first polarization status of surrounding light incident on a first surface of the polarization selective reflection means opposite to a second surface of the polarization selective reflection means on a side of the liquid crystal display medium, and for reflecting a light component in a second polarization status of the surrounding light incident on the first surface, the second polarization status being different from the first polarization status;
light irradiating means, provided between the polarization selective reflection means and the liquid crystal display medium, for irradiating the liquid crystal display medium with light from a light source; and
polarization control means, provided between the polarization selective reflection means and the light irradiating means, for controlling a polarization status of light traveling from the polarization selective reflection means towards the liquid crystal display medium; and
an enclosure which covers an outer surface of the liquid crystal display device, the enclosure including (i) a display window on a surface thereof facing to the liquid crystal display medium and (ii) a light inlet window on a surface thereof facing to the polarization selective reflection means of the enclosure.

3. The liquid crystal display device as set forth in claim 2, wherein
the polarization control means is a polarization controlling liquid crystal medium in which the polarization status of the light is controlled in accordance with an alignment status of liquid crystal molecules in the liquid crystal layer.

4. The liquid crystal display device as set forth in claim 1, wherein
the polarization selective reflection means transmits first linearly polarized light of light incident on the first surface opposite to the second surface on the side of the liquid crystal display medium, and reflects second linearly polarized light which is perpendicular to the first linearly polarized light.

5. The liquid crystal display device as set forth in claim 3, wherein
the liquid crystal layer of the polarization controlling liquid crystal medium is a twist nematic liquid crystal layer.

6. The liquid crystal display device as set forth in claim 1, wherein
the liquid crystal layer has a TN orientation twisted by 90° in a thickness direction of the liquid crystal layer, transmission axes of the first polarizing plate and the second polarizing plate are arranged so as to perpendicularly cross each other, a transmission axis of the polarization selective reflection means is arranged so that a direction of the transmission axis coincides with a direction of the transmission axis of the first polarizing plate, and a reflection axis of the polarization selective reflection means is arranged so as to perpendicularly cross the transmission axis of the first polarizing plate.

7. The liquid crystal display device as set forth in claim 2, wherein the liquid crystal layer has a TN orientation twisted by 90° in a thickness direction of the liquid crystal layer, transmission axes of the first polarizing plate and the second polarizing plate are arranged so as to perpendicularly cross each other, the polarization control means has a polarization controlling liquid crystal layer having a TN orientation twisted by 90° in a thickness direction of the polarization controlling liquid crystal layer, a transmission axis of the polarization selective reflection means is arranged so as to perpendicularly cross the transmission axis of the first polarizing plate, and a reflection axis of the polarization selective reflection means is arranged so that a direction of the reflection axis coincides with a direction of the transmission axis of the first polarizing plate.

* * * * *

UNITED STATES PATENT AND TRADEMARK OFFICE
CERTIFICATE OF CORRECTION

PATENT NO. : 7,599,021 B2  Page 1 of 1
APPLICATION NO. : 10/564818
DATED : October 6, 2009
INVENTOR(S) : Tsuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twenty-eighth Day of September, 2010

David J. Kappos
*Director of the United States Patent and Trademark Office*